(12) United States Patent
Kong et al.

(10) Patent No.: US 11,627,590 B2
(45) Date of Patent: Apr. 11, 2023

(54) SCHEDULING NETWORK RESOURCES IN WIRELESS COMMUNICATION DEVICES

(71) Applicant: QUALCOMM Incorporated, San Diego, CA (US)

(72) Inventors: Ting Kong, San Diego, CA (US); Yongle Wu, San Diego, CA (US); Paolo Minero, La Jolla, CA (US); Raghu Narayan Challa, San Diego, CA (US); Alexei Yurievitch Gorokhov, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/037,673

(22) Filed: Sep. 30, 2020

(65) Prior Publication Data

US 2021/0100014 A1    Apr. 1, 2021

Related U.S. Application Data

(60) Provisional application No. 62/908,198, filed on Sep. 30, 2019.

(51) Int. Cl.
*H04B 7/0404* (2017.01)
*H04B 7/0408* (2017.01)
(Continued)

(52) U.S. Cl.
CPC ...... *H04W 72/1263* (2013.01); *H04B 7/0404* (2013.01); *H04B 7/0408* (2013.01); *H04B 7/12* (2013.01); *H04B 17/0082* (2013.01); *H04B 17/14* (2015.01); *H04B 17/29* (2015.01); *H04L 5/001* (2013.01); *H04L 5/0042* (2013.01);
(Continued)

(58) Field of Classification Search
CPC ... H04B 7/02–12; H04B 17/0082–3913; H04J 11/0023–0093; H04J 2011/0003–0096; H04L 5/0001–0098; H04W 8/22–245; H04W 24/02–10; H04W 28/02–26; H04W 36/005–385; H04W 56/005–0095; H04W 72/005–14; H04W 76/10–50; H04W 84/005–22; H04W 88/005–188; H04W 92/02–24
See application file for complete search history.

(56) References Cited

U.S. PATENT DOCUMENTS

2011/0013713 A1*  1/2011  Li ..................... H04B 7/0689
2019/0253214 A1*  8/2019  Liu .................... H04B 7/0604

* cited by examiner

*Primary Examiner* — Timothy J Weidner
(74) *Attorney, Agent, or Firm* — Shumaker & Sieffert, P.A.; Dang M. Vo

(57) ABSTRACT

Aspects of the disclosure relate to a user equipment (UE) configured to schedule resource management procedures including measurements and tracking loop procedures. In some examples, the UE includes at least one antenna pair and two or more receivers. The UE may be configured to determine a plurality of combinations of antenna pairs and component carriers, where each component carrier is associated with a particular frequency. The UE may further be configured to schedule measurements/tracking loop procedures to available receivers first and utilize a selection algorithm to select combinations of antenna pairs and component carriers and map the selected combinations to the remaining of the available receivers to perform tracking loop procedures. Other aspects, features, and embodiments are also claimed and described.

30 Claims, 10 Drawing Sheets

(51) Int. Cl.
  *H04B 7/12* (2006.01)
  *H04B 17/00* (2015.01)
  *H04B 17/14* (2015.01)
  *H04B 17/29* (2015.01)
  *H04L 5/00* (2006.01)
  *H04W 24/02* (2009.01)
  *H04W 24/08* (2009.01)
  *H04W 24/10* (2009.01)
  *H04W 28/02* (2009.01)
  *H04W 28/08* (2009.01)
  *H04W 72/04* (2009.01)
  *H04W 72/12* (2009.01)
  *H04W 76/15* (2018.01)
  *H04W 76/18* (2018.01)
  *H04W 84/02* (2009.01)
  *H04W 88/06* (2009.01)
  *H04W 92/02* (2009.01)
  *H04W 92/10* (2009.01)
  *H04W 72/1263* (2023.01)
  *H04W 72/0453* (2023.01)
  *H04W 72/044* (2023.01)

(52) U.S. Cl.
  CPC ........... *H04L 5/0064* (2013.01); *H04W 24/02* (2013.01); *H04W 24/08* (2013.01); *H04W 24/10* (2013.01); *H04W 28/0205* (2013.01); *H04W 28/085* (2013.01); *H04W 28/09* (2020.05); *H04W 72/046* (2013.01); *H04W 72/0453* (2013.01); *H04W 72/1257* (2013.01); *H04W 76/15* (2018.02); *H04W 76/18* (2018.02); *H04W 84/02* (2013.01); *H04W 88/06* (2013.01); *H04W 92/02* (2013.01); *H04W 92/10* (2013.01)

Table 602 — Scheduling:

| Scheduling | SSB 1 | SSB 2 | SSB 3 | SSB 4 | SSB 5 | SSB 6 | SSB 7 |
|---|---|---|---|---|---|---|---|
|  | RRM/TL | Tracking Loops | RRM/TL | Tracking Loops | OD/TL | RLM/TL | Tracking Loops |
| NBRx_1 | PCC_rx 0/1 | PCC_rx 2/3 | PCC_rx 0/1 | SCC2_rx 0/1 | PCC_rx 0/1 | PCC_rx 0/1 | SCC3_rx 2/3 |
| NBRx_2 | SCC1_rx 0/1 | SCC1_rx 2/3 | PCC_rx 2/3 | SCC2_rx 2/3 | PCC_rx 2/3 | SCC2_rx 0/1 | PCC_rx 0/1 |
| NBRx_3 | SCC2_rx 0/1 | SCC2_rx 2/3 | SCC1_rx 0/1 | SCC3_rx 0/1 | SCC1_rx 0/1 | SCC2_rx 2/3 | PCC_rx 2/3 |
| NBRx_4 | SCC3_rx 0/1 | SCC3_rx 2/3 | SCC1_rx 2/3 | SCC3_rx 2/3 | SCC1_rx 2/3 | SCC3_rx 0/1 | SCC1_rx 0/1 |

Table 604 — Binary State:

| Binary State | Init. |  |  |  | Reset |  |  | Reset |  |
|---|---|---|---|---|---|---|---|---|---|
| PCC_rx0/1 | 0 | 1 | 1 | 1 | 1 | 0 | 0 | 0 | 0 |
| SCC1_rx0/1 | 0 | 1 | 1 | 0 | 1 | 1 | 0 | 0 | 0 |
| SCC2_rx0/1 | 0 | 1 | 0 | 0 | 1 | 0 | 0 | 0 | 0 |
| SCC3_rx0/1 | 0 | 1 | 0 | 0 | 1 | 1 | 0 | 0 | 0 |
| PCC_rx2/3 | 0 | 0 | 1 | 1 | 1 | 1 | 1 | 1 | 1 |
| SCC1_rx2/3 | 0 | 0 | 1 | 1 | 1 | 1 | 1 | 0 | 1 |
| SCC2_rx2/3 | 0 | 0 | 1 | 1 | 1 | 0 | 0 | 0 | 0 |
| SCC3_rx2/3 | 0 | 0 | 1 | 1 | 1 | 1 | 0 | 0 | 0 |

FIG. 6

SCHEDULING NETWORK RESOURCES IN WIRELESS COMMUNICATION DEVICES

PRIORITY CLAIM

This application claims the benefit of provisional patent application No. 62/908,198 filed in the United States Patent and Trademark Office (USPTO) on Sep. 30, 2019, the entire content of which is incorporated herein by reference as if fully set forth below in its entirety and for all applicable purposes.

TECHNICAL FIELD

The technology discussed below relates generally to wireless communication networks, and more particularly, to scheduling network resources within wireless communication devices. Some examples and techniques enable and provide communications devices, methods, and systems for scheduling measurements and/or tracking loops with each combination of antenna pair (e.g., a pair of two antennas) and component carrier on the number of receivers within the wireless communication device.

INTRODUCTION

In fifth generation (5G) wireless communication networks, such as the New Radio (NR) wireless communication network, communication between a base station and a user equipment (UE) may utilize a wideband spectrum. For example, millimeter wave networks may support a bandwidth of 800 MHz for downlink and uplink transmissions. The base station may allocate the wideband spectrum to the UE as a number of narrowband component carriers and carrier aggregation may be performed at the UE. For example, one of the narrowband component carriers may be a primary component carrier (PCC) and the other activated (e.g., scheduled) component carriers may be secondary component carriers (SCCs).

As the demand for mobile broadband access continues to increase, research and development continue to advance communication technologies, including technologies for enhancing scheduling of tracking loops when employing multiple component carriers in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to a user equipment (UE) configured to schedule resource management procedures utilizing received reference signals, such as synchronization signal blocks (SSBs). The resource management procedures may include a measurement and/or a tracking loop procedure on component carriers. The measurement may include Radio Resource Management (RRM), Radio Link Failure (RLM), and/or on-demand measurement. The tracking loop procedure may include a time tracking loop (TTL) procedures a frequency tracking loop (FTL) procedure, a power delay profile (PDP) estimation procedure, and/or an automatic gain control (AGC) procedure. In some examples, the UE includes at least one antenna pair and two or more receivers. The UE may be configured to determine a plurality of combinations of antenna pairs and component carriers. The UE may further be configured to identify available receivers, select combinations of antenna pairs and component carriers and map the selected combinations to available receivers to perform measurements and/or tracking loop procedures utilizing received reference signals, such as synchronization signal blocks (SSBs).

In some examples, the UE may maintain a binary variable corresponding to each of the combinations and initialize the respective binary variable corresponding to each of the combinations by setting the respective binary variable to a first value (e.g., zero). The first value of the binary variable indicates that the respective combination is able to perform a tracking loop procedure. Upon scheduling a combination to perform a measurement of a reference signal (e.g., SSB) utilizing a receiver, the UE may further schedule the combination and corresponding receiver to perform a tracking loop procedure utilizing the received SSB. The UE may then set the binary variable corresponding to the scheduled combination to a second value (e.g., one). The second value of the binary variable indicates that the respective combination is unavailable to perform a tracking loop procedure. The UE may further select non-scheduled combinations based on the number of available receivers to perform tracking loop procedures and set the binary variable corresponding to the selected combinations to the second value. In some examples, the UE may select the combinations in order of component carrier. For example, the UE may select each combination involving a primary component carrier first and then select combinations involving secondary component carriers in order of component carrier identity. However, it should be appreciated that the selection may made in a different order. Once the binary variable corresponding to each of the combinations is set to one, the UE may reset the binary variable corresponding to each of the combinations to zero.

In one example, a method for wireless communication at a UE in a wireless communication network is disclosed. The method includes determining a plurality of combinations of a plurality of component carriers and at least one antenna pair within the UE, where each of the plurality of combinations includes a respective antenna pair of the at least one antenna pair and a respective component carrier of the plurality of component carriers. The method further includes identifying one or more available receivers of the plurality of receivers, selecting one or more combinations of the plurality of combinations based on the identified one or more available receivers, mapping each combination of the one or more selected combinations to a respective receiver of the one or more identified available receivers in a predetermined order, and performing, for each receiver of the one or more mapped available receivers, a respective resource management procedure.

Another example provides a UE in a wireless communication network including at least one antenna pair, two or more receivers coupled to the plurality of antenna pairs, a memory, and a processor communicatively coupled to the two or more receivers, and the memory. The processor is configured to determine a plurality of combinations of a plurality of component carriers and the at least one antenna pair, where each of the plurality of combinations includes a respective antenna pair of the at least one antenna pair and a respective component carrier of the plurality of component carriers. The processor is further configured to identify one or more available receivers of the plurality of receivers, select one or more combinations of the plurality of combinations based on the identified one or more available receivers, map each combination of the one or more selected combinations to a respective receiver of the one or more identified available receivers in a predetermined order, and perform, for each receiver of the one or more mapped available receivers, a respective resource management procedure.

Another example provides a UE in a wireless communication network. The UE includes means for determining a plurality of combinations of a plurality of component carriers and at least one antenna pair within the UE, where each of the plurality of combinations includes a respective antenna pair of the at least one antenna pair and a respective component carrier of the plurality of component carriers. The UE further includes means for identifying one or more available receivers of the plurality of receivers, means for selecting one or more combinations of the plurality of combinations based on the identified one or more available receivers, means for mapping each combination of the one or more selected combinations to a respective receiver of the one or more identified available receivers in a predetermined order, and means for performing, for each receiver of the one or more mapped available receivers, a respective resource management procedure.

Another example provides a non-transitory computer-readable medium storing computer-executable code, including code for causing a UE to determine a plurality of combinations of a plurality of component carriers and at least one antenna pair within the UE, where each of the plurality of combinations includes a respective antenna pair of the at least one antenna pair and a respective component carrier of the plurality of component carriers. The non-transitory computer-readable medium further includes code for causing the UE to identify one or more available receivers of the plurality of receivers, select one or more combinations of the plurality of combinations based on the identified one or more available receivers, map each combination of the one or more selected combinations to a respective receiver of the one or more identified available receivers in a predetermined order, and perform, for each receiver of the one or more mapped available receivers, a respective resource management procedure.

Another example provides a method for wireless communication at a UE. The UE determines one or more combinations of a plurality of component carriers and a plurality of antenna pairs. Here, each of the one or more combinations includes an antenna pair of the plurality of antenna pairs and a respective component carrier of the plurality of component carriers. The UE selects at least one combination of the one or more combinations based on one or more receivers of the UE. Accordingly, the UE performs a respective resource management procedure for at least one of the receivers based on the one or more combinations.

Another example provides a UE in a wireless communication network. The UE includes at least one antenna pair, two or more receivers coupled to the at least one antenna pair, a memory, and a processor communicatively coupled to the two or more receivers and the memory. Here, the processor is configured to determine a plurality of combinations of a plurality of component carriers and the plurality of antenna pairs. Each of the plurality of combinations includes an antenna pair of the plurality of antenna pairs and a respective component carrier of the plurality of component carriers. The processor is further configured to select one or more combinations of the plurality of combinations based on one or more available receivers. The processor is further configured to perform a respective resource management procedure, for each receiver of the one or more mapped available receivers.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

BRIEF DESCRIPTION OF THE DRAWINGS

FIG. 6 is a diagram illustrating an example implementation of a binary state selection algorithm for resource management procedures according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
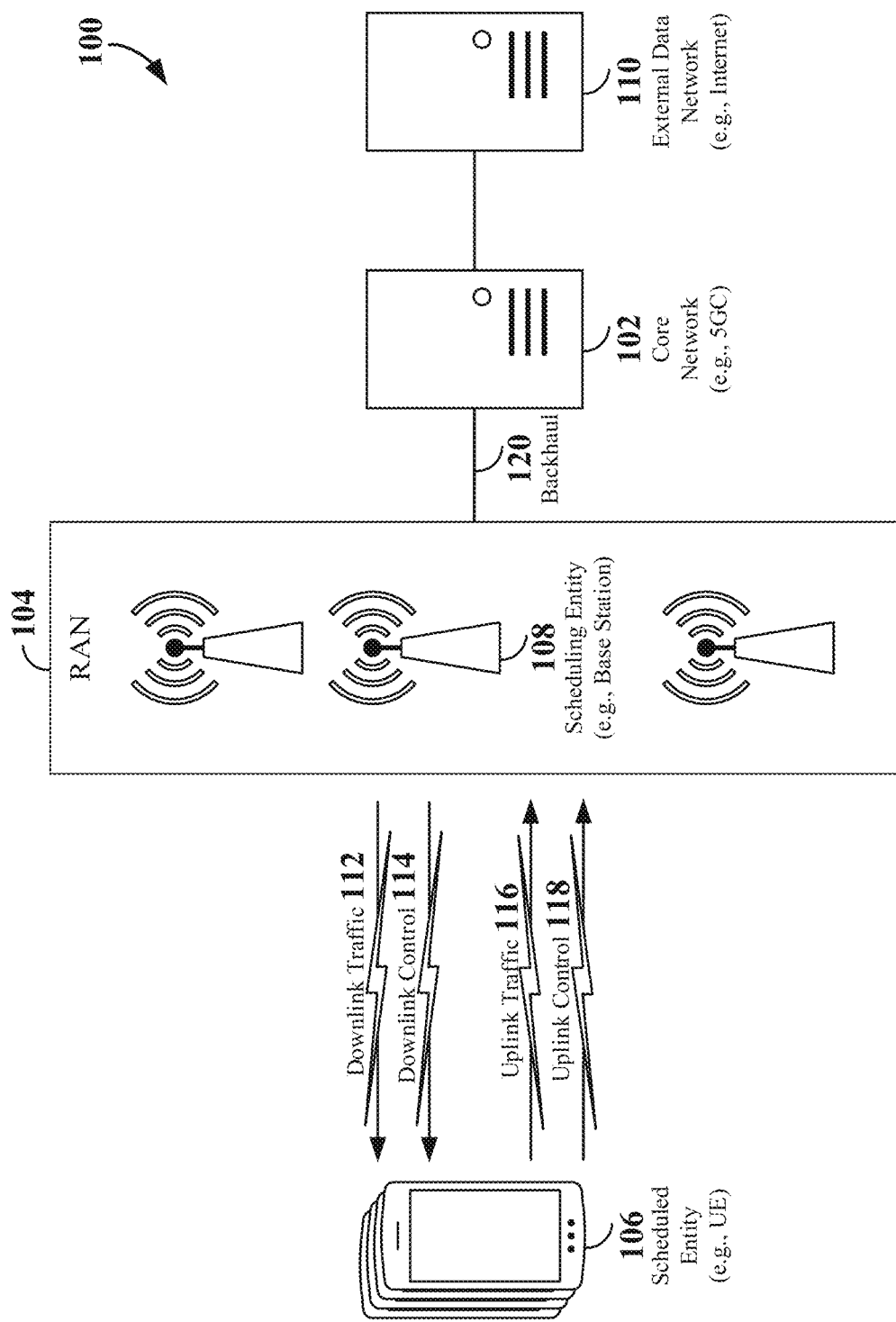
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G-NR. As another example, the RAN 104 may operate under a hybrid of 5G-NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple types of UE. UE may be any device or apparatus that allows an access to network services. UE may be referred to as user equipment in 3GPP standards, but may also be referred to by those skilled in the art as a mobile apparatus, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. The term "mobile" need not necessarily have a capability to move, and may be stationary.

Within the present document, a UE may include a number of hardware structural components sized, shaped, and arranged to help in communication; such components can include antennas, antenna arrays, RF chains, amplifiers, one or more processors, etc. electrically coupled to each other. For example, some non-limiting examples of a UE include a customer premises equipment (CPE) which permits an access to network services, a device which provides local area networking of devices and internet access to other devices through a wireless communications service, a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A UE may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A UE may additionally be a digital home or smart home device such as a home audio, video, and/or multimedia device, an appliance, a vending machine, intelligent lighting, a home security system, a smart meter, etc. A UE may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a UE may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
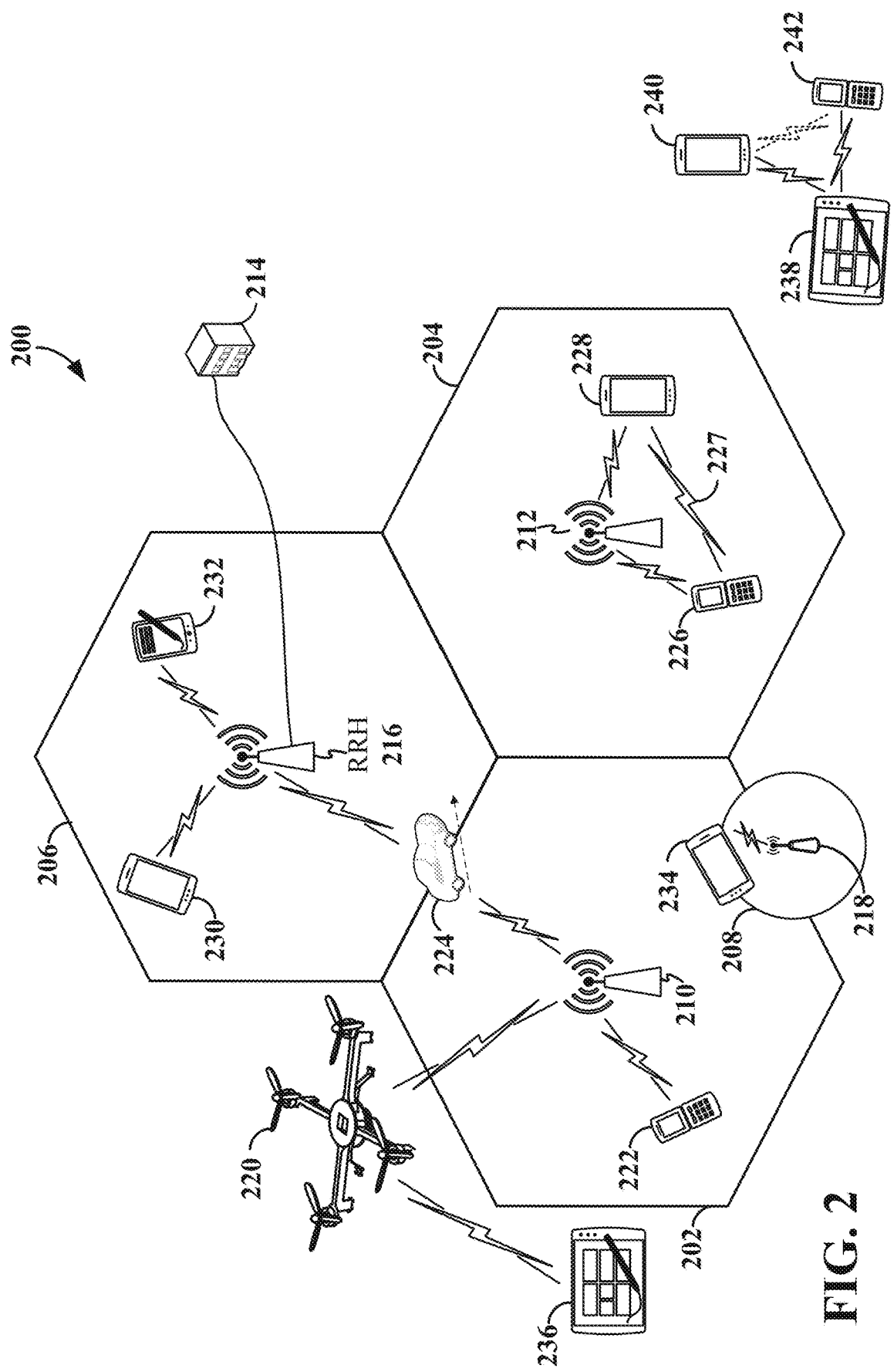
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. It is to be understood that the radio access network 200 may include any number of wireless base stations and cells. Further, a relay node may be deployed to extend the size or coverage area of a given cell. The base stations 210, 212, 214, 218 provide wireless access points to a core network for any number of UEs. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDM waveform (e.g., a DFT-s-OFDM waveform) in substantially the same way as described herein below. That is, while some examples of the present disclosure may focus on an OFDM link for clarity, it should be understood that the same principles may be applied as well to SC-FDM waveforms.

Figure 3:
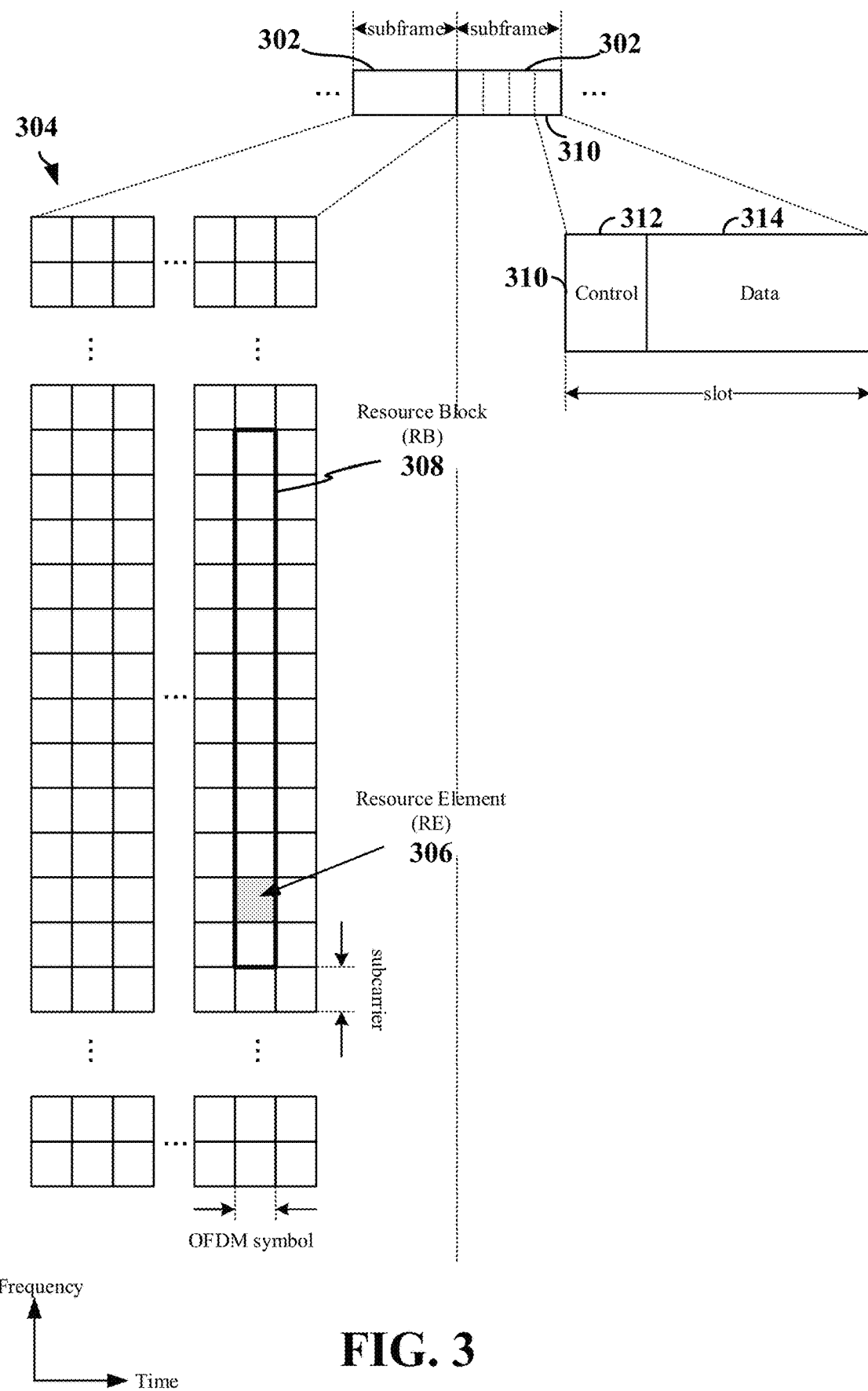
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more bandwidth parts, where each bandwidth part includes two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other non-limiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PBCH may further include a master information block (MIB) that includes various system information, along with parameters for decoding a system information block (SIB). The SIB may be, for example, a SystemInformationType1 (SIB1) that may include various additional system information. Examples of system information may include, but are not limited to, subcarrier spacing, system frame number, cell bar indication, a list of common control resource sets (CoreSets) (e.g., PDCCH CoreSet0 or CoreSet1), a list of common search spaces, a search space for SIB1, a paging search space, a random access search space, and uplink configuration information.

In 5G networks, the DL control information may further include a physical control format indicator channel (PC-FICH) and/or a physical hybrid automatic repeat request (HARQ) indicator channel (PHICH). The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Wireless Communication System Between Transmitting Device and Receiving Device

Figure 4:
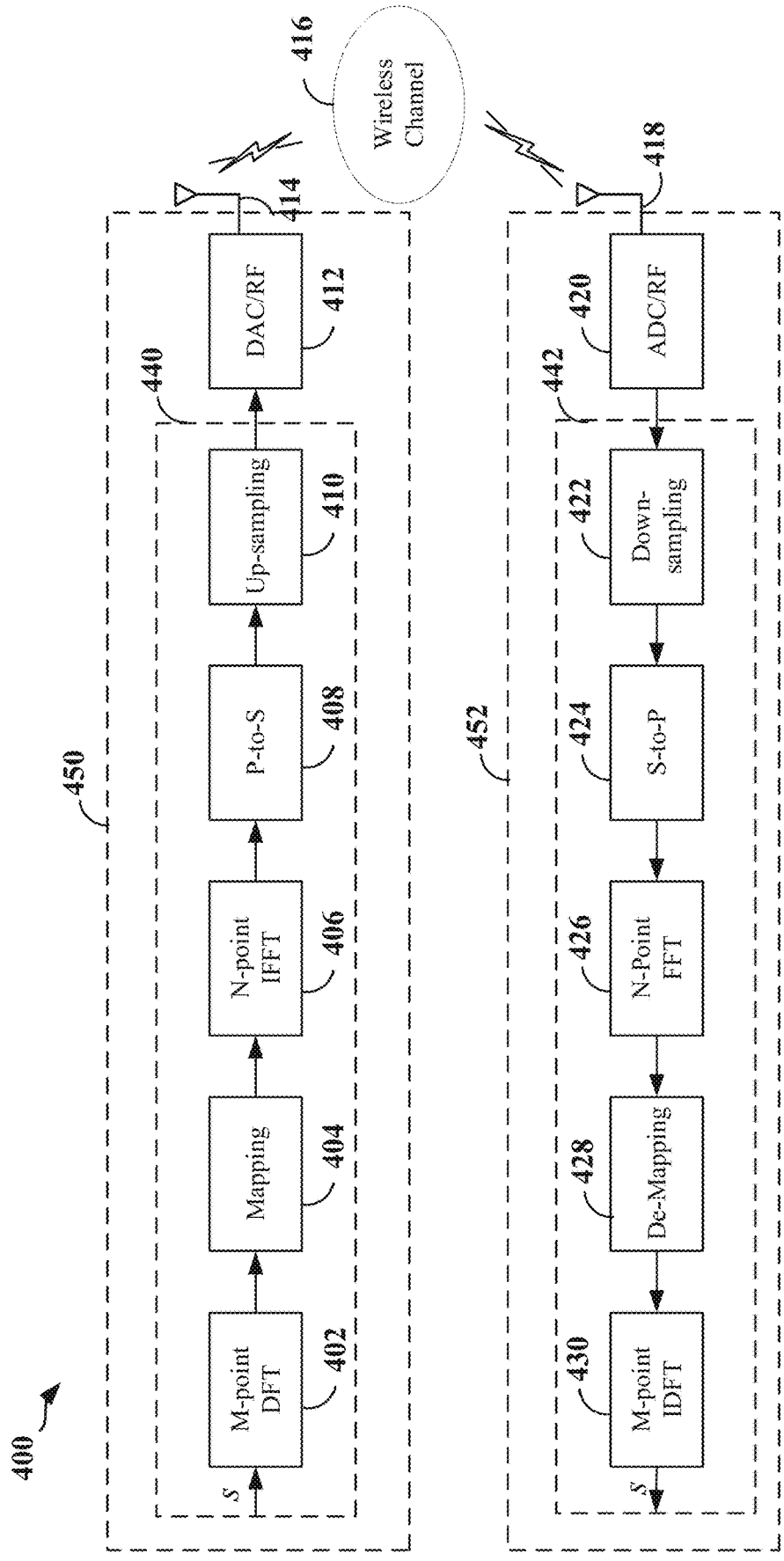
FIG. 4 is a diagram illustrating a wireless communication system as may be implemented between a transmitting device and a receiving device within a radio access network according to some aspects.

FIG. 4 is a schematic illustration of a wireless communication system 400 as may be implemented between a transmitting device 450 and a receiving device 452 within a radio access network, such as the RAN 200 shown in FIG. 2. In some examples, the transmitting device 450 may correspond to a scheduling entity (e.g., a base station) and the receiving device 452 may correspond to a scheduled entity (e.g., a UE). In other examples, the transmitting device 450 may correspond to a scheduled entity (e.g., a UE) and the receiving device 452 may correspond to a scheduling entity (e.g., a base station). In the example shown in FIG. 4, the transmitting device 450 and receiving device 452 each include a single antenna 414 and 418, respectively. However, it should be understood that the transmitting device 450 and receiving device 452 may each include any number of antennas.

The transmitting device 450 may include a transmitter 440 (e.g., a digital transmit chain) configured to receive a baseband symbol stream s, which may be of length M and be composed of complex modulated symbols generated from an original bit stream using a particular modulation scheme (e.g., QPSK, 16 QAM, 64 QAM, etc.). The symbol stream s may be encoded (not shown) and input to an M-point discrete Fourier transform (DFT) 402 (corresponding to the length M of the symbol stream), which performs DFT precoding on the symbol streams. In general, the DFT 402 constructs a discrete frequency domain representation of the complex modulated symbols to produce precoded frequency domain symbols forming a frequency domain symbol stream. At the output of the DFT 402, the precoded frequency domain symbols are then mapped onto the assigned subcarriers by mapping circuitry 404 and then input to an N-point inverse fast Fourier transform (IFFT) 406 for time domain conversion to produce respective time domain symbols (e.g., OFDM symbols, as shown in FIG. 3) forming a time domain symbol stream.

The time domain symbols output from the N-point IFFT 406 pass through a parallel-to-serial (P-to-S) converter 408 and up-sampling circuitry 410, where the time domain symbol stream is up-sampled (e.g., to a radio frequency (RF)) to produce an up-sampled symbol stream. The up-sampled symbol stream may then be further processed (not shown, for simplicity) and input to a digital-to-analog converter (DAC)/radio frequency (RF) circuitry 412 for analog conversion of the up-sampled symbol stream to produce an RF signal. The RF signal may then be transmitted via antenna 414. In some examples, the RF signal may be a millimeter-wave (mmWave) signal or a sub-6 GHz signal.

The RF signal traverses a wireless channel 416 to the receiver 442, where the RF signal is received by the antenna 418 and converted to a digital signal corresponding to a time domain symbol stream by RF/analog-to-digital converter (ADC) circuitry 420. The digital signal may then be provided to a receiver 442 (e.g., a digital receive chain) including down-sampling circuitry 422, where the digital signal is down-converted to baseband to produce a down-sampled symbol stream. The down-sampled symbol stream may then be input to a serial-to-parallel (S-to-P) converter 424 and an N-point fast Fourier transform (FFT) 426, where the time domain signal is transformed to a frequency domain signal. Subcarrier de-mapping may then be performed by de-mapping circuitry 428, and the de-mapped signal is input to an M-point IDFT 430 for time domain conversion to produce the symbol stream s of complex modulated symbols. Further signal processing may then be performed to demodulate and decode the symbol stream to produce the original bit stream.

In some examples, the scheduling entity (e.g., base station), which may be the transmitting device 450 in FIG. 4, may utilize one or more of a plurality of component carriers for downlink transmissions from the scheduling entity to the scheduled entity (e.g., UE). For example, one of the component carriers may be a primary component carrier (PCC) and the other activated (e.g., scheduled) component carriers for the UE may be secondary component carriers (SCCs). The component carriers may be mmWave carriers or sub-6 GHz carriers. In some examples, each of the narrowband component carriers may correspond to a 200 kHz frequency band. However, the term "narrowband" does not necessarily involve a narrow range of frequencies. For example, the narrowband component carrier can be any component carrier occupying any suitable bandwidth, including a narrow bandwidth, wide bandwidth, or ultra wide bandwidth. Carrier aggregation of the narrowband component carriers may then be performed at the UE, which may be the receiving device 452 in FIG. 4, to process the received downlink transmissions.

Resource Management Procedure Using Synchronization Signal Block

In some examples, the UE may utilize a channel state information-reference signal (CSI-RS) or a synchronization signal block (SSB) transmitted by the base station on each of the PCC and SCCs as a reference signal for resource management procedures. The SSB may be transmitted within a cell with known periodicity (e.g., 20 ms). The resource management procedures may include, but are not limited to, tracking loop procedures and/or measurements.

In an aspect of the disclosure, the UE may schedule tracking loop procedures on the PCC and activated SCCs based on the known periodicity of the SSB. The tracking loop procedures may include, e.g., a time tracking loop (TTL), frequency tracking loop (FTL), power delay profile (PDP) estimation, and/or automatic gain control (AGC) procedure on the PCC and activated SCCs. For example, by implementing a TTL, the UE may be able to correct the timing error and optimize the starting point of the FFT window to minimize inter-carrier interference (ICI) and inter-symbol interference (ISI). FTLs may enable the UE to correct the carrier frequency offset due to RF impairments at both the UE and the base station and may further enable the UE to correct the Doppler shift due to UE mobility. In addition, the UE may perform a PDP estimation to compensate for dispersion or distribution of power over various paths due to multi-path propagation. The UE may further perform various AGC procedures to control the level or gain of the received signal in order to minimize the block error rate (BLER) of the received signal.

In an aspect of the disclosure, the SSB may be used for other purposes, e.g., to perform measurements. Examples of measurements may include, but are not limited to, radio resource management (RRM) cell searches and measurements, radio link failure (RLM) measurements, and/or on-demand measurements. An example of an on-demand measurement may include, for example, beam/antenna pair measurements.

In some examples, the UE may support two or more digital receive chains (e.g., receivers 442), each configured to separately process one of the narrowband component carriers. For example, when an SSB is utilized as a reference signal for loop tracking, one receiver may be configured to capture SSB samples from one component carrier.

User Equipment including Multiple Receivers

Figure 5:
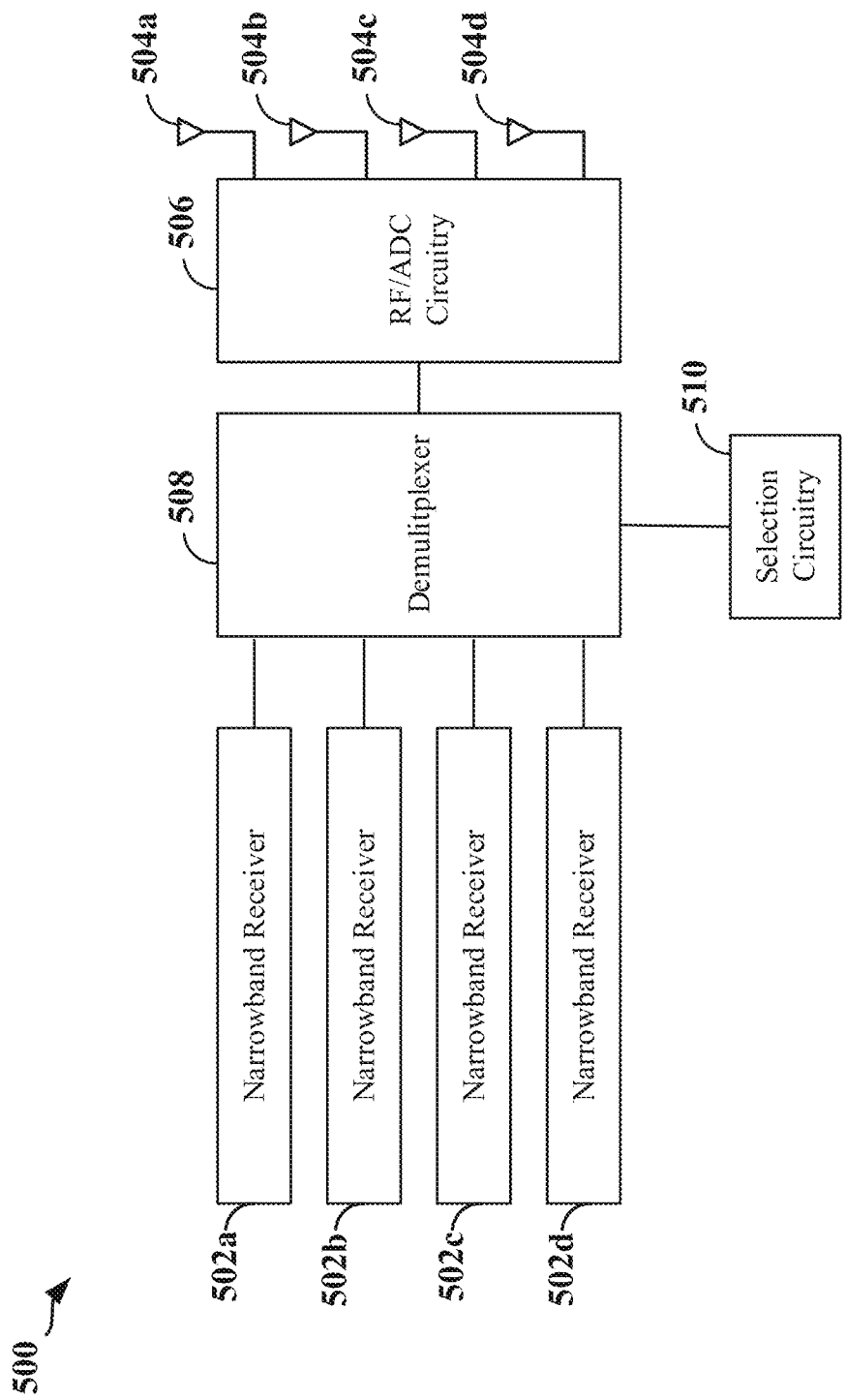
FIG. 5 is a diagram illustrating an example of a portion of a user equipment (UE) including multiple receivers for performing resource management procedures according to some aspects.

FIG. 5 is a diagram illustrating an example of a portion of a UE 500 configured to receive and process multiple component carriers. The UE 500 includes multiple parallel receive chains, four of which 502a, 502b, 502c, and 502d, are illustrated for simplicity. Each of the narrowband receive chains 502a-502d is configured to separately process a component carrier of a wideband spectrum. For example, each narrowband receive chain 502a-502d (also referred to herein as receivers) may correspond to the receiver 442 shown in FIG. 4.

The UE 500 further includes multiple antennas, four of which 504a, 504b, 504c, and 504d, are illustrated for simplicity. The antennas 504a-504d are shown coupled to RF/ADC circuitry 506 for conversion of the RF signal received via the antennas 504a-504d to a digital signal. A demultiplexer 508 is shown coupled between the RF/ADC circuitry 506 and receivers 502a-502d and is configured to couple digital signals corresponding to RF signals received via the antennas 504a-504d to the receivers 502a-502d. In some examples, the antennas 504a-504d may be grouped into antenna pairs. For example, a first antenna pair may include antennas 504a and 504b, while a second antenna pair may include antennas 504c and 504d. The demultiplexer 508 may be configured to couple the digital signal corresponding to a component carrier received via one of the antenna pairs (e.g., antennas 504a and 504b) to one of the receivers (e.g., receiver 502a).

In order to facilitate a tracking loop procedure (e.g., TTL, FTL, PDP estimation, or AGC), the UE 500 may schedule the tracking loop procedure on each combination of a component carrier and an antenna pair and map each combination of component carrier and antenna pair to a receiver to perform the scheduled tracking loop procedure. In an example in which there are two component carriers (CC1 and CC2), the UE 500 may schedule a tracking loop procedure on CC1 and antenna pair 504a/504b to be performed on receiver 502a, a tracking loop procedure on CC1 and antenna pair 504c/504d to be performed on receiver 502b, a tracking loop procedure on CC2 and antenna pair 504a/504b to be performed on receiver 502c, and a tracking loop procedure on CC2 and antenna pair 504c/504d to be performed on receiver 502d.

As the number of component carriers increases, the number of receivers 502a-502d needed to perform tracking loop procedures on all combinations of component carriers and antenna pairs may exceed the UE capability. For example, if the number of component carriers increases to four, the number of receivers 502a-502c for performing tracking loop procedures on all combinations of component carriers and antenna pairs increases to eight. As another example, if the UE 500 includes only a single antenna pair (e.g., antennas 504a and 504b), and the number of component carriers increases to eight, the number of receivers 502a-502c for performing tracking loop procedures on all combinations of component carriers and antenna pairs also increases to eight.

Therefore, in various aspects of the disclosure, the UE 500 may include selection circuitry 510 configured to select combinations of component carriers and antenna pairs 504a-504d (also referred to herein as CC-Rx combinations) and map the selected CC-Rx combinations to available receivers 502a-502d via the demultiplexer 508. In some examples, the selection circuitry 510 enables performing a tracking loop procedure on each of the CC-Rx combinations over time.

In some examples, the selection circuitry 510 may schedule one or more CC-Rx combinations on corresponding receivers 502a-502d to process received SSB samples for a different purpose. For example, the selection circuitry 510 may select a CC_Rx combination based on a characteristic of a measurement and schedule a receiver to perform the measurement of the SSB samples received on a CC-Rx combination. Examples of measurements may include, but are not limited to, radio resource management (RRM) cell searches and measurements, radio link failure (RLM) measurements, and/or on-demand measurements. An example of an on-demand measurement may include, for example, beam/antenna pair measurements. The characteristic of the measurement may be that the measurement is scheduled on at least one predetermined antenna pair of the at least one antenna pair. For example, RRM and RLM may be firstly scheduled on Rx pair 504a, 504b, and on-demand measurement may be scheduled on both Rx pair 504a, 504b and Rx pair 504c, 504d. However, it should be appreciated that the characteristic of the measurement is not limited to the above described antenna pair. RRM, RLM, and on-demand measurement may employ a different scheduling condition. In an aspect of the disclosure, the selection circuitry 510 may further schedule the receiver to perform a tracking loop procedure using the same SSB samples received on the CC-Rx combination. For example, the selection circuitry 510 may schedule the receiver 502a to perform both a measurement (e.g., RRM, RLM, or on-demand) and a tracking loop procedure (e.g., TTL, FTL, PDP estimation, or AGC) using the SSB received on CC1 via antenna pair 504a/504b. Thus, the CC-RX combination can be scheduled for both of the measurement and the tracking loop procedure.

After the measurement and the tracking loop procedure may be scheduled based on the characteristic of the measurement, the selection circuitry 510 may then identify non-scheduled CC-Rx combinations, select a number of the CC-Rx combinations based on a number of available receivers (e.g., receivers not previously scheduled to perform both a measurement and tracking loop procedure), and map the selected CC-Rx combinations to the available receivers (e.g., receivers 502b, 502c, and 502d) to perform tracking loop procedures on the selected CC-Rx combinations. Thus, scheduling CC-Rx combinations for RRM, RLM, and on-demand measurement may be prioritized. When the measurements are scheduled on CC-Rx combinations with available receivers, tracking loop procedures may be concurrently scheduled on the same CC-Rx combinations with the same available receivers. At the same time, scheduling CC-Rx combinations for tracking loop procedures can achieve fairness. This also may enable the tracking loop procedures to be scheduled on all CC-Rx combinations.

In some examples, the selection circuitry 510 may select the CC-Rx combinations in a predetermined order. For example, the selection circuitry 510 may select the CC-Rx combinations starting with the PCC followed by each of the SCCs with increasing order of the component carrier identity (CC_id). In addition, the selection circuitry 510 may schedule each antenna pair on a component carrier before scheduling another component carrier. However, the order of selection is not limited to the order described above. The selection may start with the SCCs with increasing or decreasing order of the component carrier identity (CC_id) followed by the PCC.

Binary State Algorithm

In some examples, the resource management procedures can be scheduled with fairness among all CC-Rx combinations while supporting prioritizing some CC-Rx combinations when a binary state algorithm is implemented. The selection circuitry 510 may implement a binary state algorithm in which a binary variable is maintained for each of the CC-Rx combinations and updated as CC-Rx combinations are selected for performing tracking loops. The binary variable may be stored in a binary variable table 715 in a non-transitory computer readable medium 705. A value of the binary variable can be a first value or a second value. For example, the first value of the binary variable corresponding to a CC-Rx combination indicates that the CC-Rx combination is available to perform a tracking loop procedure. On the other hand, the second value of the binary variable corresponding to a CC-Rx combination indicates that the CC-Rx combination is unavailable to perform the tracking loop procedure. The first value may be zero, while the second value may be one. However, the first and second values can be any predetermined value if the value consistently signifies availability of the tracking loop on the respective CC_Rx combination. FIG. 6 illustrates an example implementation of a binary state algorithm in which a first table 602 is utilized to map the CC-Rx combinations 606 to receivers 608 to perform tracking loops and other measurements for each received SSB and a second table 604 is utilized to update a respective binary variable corresponding to each CC-Rx combination 606 based on the mapping in the first table 602. In the example shown in FIG. 6, the UE includes four receivers 608 (e.g., NBRx_1, NBRx_2, NBRx_3, and NBRx_4) and two antenna pairs (e.g., Rx0/1 and Rx2/3). In addition, in the example shown in FIG. 6, there are four component carriers (e.g., PCC, SCC1, SCC2, and SCC3). It should be understood that the implementation illustrated in FIG. 6 is not limited to any particular number of antenna pairs, receivers, and/or component carriers, but instead may include any suitable number of antenna pairs, receivers, and/or component carriers.

As illustrated in the second table 604, the binary state algorithm initializes every binary variable corresponding to the CC-Rx combinations 606 by setting every binary variable to a first value (e.g., zero). In other words, the binary state algorithm sets a respective binary variable corresponding to each of the CC-Rx combinations 606 to zero before any available receiver 502a-502d is firstly identified. As tracking loop procedures are scheduled on the CC-Rx combinations 606, the binary state algorithm may set the binary variable corresponding to the scheduled CC-Rx combinations 606 to one. Once the binary variable corresponding to each of the CC-Rx combinations 606 is set to one, the binary state algorithm may reset the binary variable of each of the CC-Rx combinations to zero. In addition, when a CC-Rx combination 606 with a binary variable of one is subsequently scheduled for a measurement (e.g., RRM, RLM, or on-demand measurement) with a tracking loop procedure after another measurement with another tracking loop procedure is scheduled, the binary state algorithm may maintain the binary variable of one for that subsequently scheduled CC-Rx combination 606 to enable the measurement with the tracking loop procedure to be scheduled on the same CC-Rx combination 606 for which another measurement with another tracking loop procedure has already been performed. In some examples, the binary state algorithm may further schedule another tracking loop procedure (e.g., the same or a different tracking loop procedure) on the subsequently scheduled CC-Rx combination 606.

Upon receiving the first SSB (e.g., SSB1) after initialization, the UE (e.g., binary state algorithm implemented by the selection circuitry 510 on the UE) may schedule measurements and tracking loops on one or more of the CC-Rx combinations 606 and then schedule the CC-Rx combinations 606 that have not yet been scheduled for tracking loops on any remaining available receivers 608 in order of component carrier. For example, the UE may schedule the primary component carrier (PCC) first and then each of the secondary component carriers (SCCs) with increasing order of the component carrier identity (e.g., SCC1, SCC2, and SCC3). However, the UE may schedule component carriers in a different order. In addition, the UE may schedule each antenna pair on a component carrier before scheduling another component carrier.

In the example shown in FIG. 6, for SSB1, the UE schedules an RRM cell search on four CC-Rx combinations 606 (PCC_rx0/1, SCC1_rx0/1, SCC2_rx0/1, and SCC3_rx0/1). In addition, the UE may further schedule a tracking loop procedure on each of the scheduled CC-Rx combinations. The tracking loop procedure may be concurrently scheduled with the RRM cell search on the same four CC-Rx combinations. The UE may then map each of the scheduled CC-Rx combinations 606 to one of the receivers 608, as indicated in the first table 602. For example, PCC_rx0/1 is shown mapped to NBRx_1, SCC1_rx0/1 is shown mapped to NBRx_2, SCC2_rx0/1 is shown mapped to NBRx_3, and SCC3_rx0/1 is shown mapped to NBRx_4. Once the CC-Rx combinations 606 have been scheduled for tracking loops for SSB1, the UE further sets the binary variable of each of the scheduled CC-Rx combinations 606 to one, as indicated in the second table 604.

At the next SSB (e.g., SSB2), after scheduling the RRM or search measurements and tracking loop procedures using SSB 1, the UE may schedule the CC-Rx combinations 606 that have not yet been scheduled for tracking loops on any remaining available receivers 608 in order of component carrier. Here, the non-scheduled CC-Rx combinations include PCC_rx2/3, SCC1_rx2/3, SCC2_rx2/3, and SCC3_rx2/3. In the example shown in FIG. 6, the UE may forgo scheduling any measurements on CC-Rx combinations 606 for SSB2 and instead schedules the non-scheduled CC-Rx combinations 606 for tracking loops on available receivers 608. For example, the UE first schedules PCC_rx2/3 and maps PCC_rx2/3 to NBRx_1 to perform a tracking loop procedure, as shown in the first table 602. The UE then schedules SCC1_rx2/3, SCC2_rx2/3, and SCC3_rx2/3 on NBRx_2, NBRx_3, and NBRx_4, respectively, to perform respective tracking loop procedures, as shown in the first table 602. Once the CC-Rx combinations 606 have been scheduled for tracking loops for SSB2, the UE further sets the binary variable of each of the scheduled CC-Rx combinations 606 to one, as shown in the second table 604. On the other hand, the UE may schedule any measurements on CC-Rx combinations 606 for SSB2.

After SSB2, the binary variable corresponding to each of the CC-Rx combinations is one, indicating that a tracking loop procedure has been performed on each of the CC-Rx combinations. Therefore, the binary variable corresponding to each of the CC-Rx combinations may be reset to zero, as shown in the second table 604. At the next SSB (e.g., SSB3), the UE may again schedule measurements and tracking loops on one or CC-Rx combinations and then schedule the CC-Rx combinations 606 that have not yet been scheduled for tracking loops on any remaining available receivers 608 in order of component carrier. In the example shown in FIG. 6, the UE schedules a RRM measurement and tracking loop procedure for SSB3 to be performed on PCC_rx0/1 and maps PCC_rx0/1 to NBRx_1. The UE then schedules the remaining non-scheduled CC-Rx combinations 606 for tracking loops on available receivers 608 in order of component carrier. For example, the UE first schedules PCC_rx2/3 and maps PCC_rx2/3 to NBRx_2 to perform a tracking loop procedure, as shown in the first table 602. The UE then schedules SCC1_rx0/1 and SCC1_rx2/3 on NBRx_3 and NBRx_4, respectively, to perform respective tracking loop procedures, as shown in the first table 602. Once the CC-Rx combinations 606 have been scheduled for tracking loops for SSB3, the UE further sets the binary variable corresponding to each of the scheduled CC-Rx combinations 606 to one, as shown in the second table 604.

At the next SSB (e.g., SSB4), the UE may again schedule the CC-Rx combinations 606 that have not yet been scheduled for tracking loops on any remaining available receivers 608 in order of component carrier. In the example shown in FIG. 6, the UE forgoes scheduling any measurements on CC-Rx combinations 606 for SSB4 and instead schedules the non-scheduled CC-Rx combinations 606 for tracking loops on available receivers 608. Here, the non-scheduled CC-Rx combinations 606 include SCC2_rx0/1, SCC2_rx2/3, SCC3_rx0/1, and SCC3_rx2/3. For example, the UE may schedule SCC2_rx0/1, SCC2_rx2/3, SCC3_rx0/1, and SCC3_rx2/3 on NBRx_1, NBRx_2, NBRx_3, and NBRx_4, respectively, to perform respective tracking loop procedures, as shown in the first table 602. Once the CC-Rx combinations 606 have been scheduled for tracking loops for SSB2, the UE further sets the binary variable of each of the scheduled CC-Rx combinations 606 to one, as shown in the second table 604.

After SSB4, the binary variable corresponding to each of the CC-Rx combinations is one, indicating that a tracking loop procedure has been performed on each of the CC-Rx combinations. Therefore, the UE may reset the binary variable of each of the CC-Rx combinations to zero, as shown in the second table 604. At the next SSB (e.g., SSB5), the UE may again schedule measurements and tracking loops on one or CC-Rx combinations and then schedule the CC-Rx combinations 606 that have not yet been scheduled for tracking loops on any remaining available receivers 608 in order of component carrier. In the example shown in FIG. 6, the UE schedules an on-demand measurement and tracking loop procedure for SSB5 to be performed on PCC_rx0/1, PCC_rx2/3, SCC1_rx0/1, and SCC1_rx2/3 and maps PCC_rx0/1, PCC_rx2/3, SCC1_rx0/1, and SCC1_rx2/3 to NBRx_1, NBRx_2, NBRx_3, and NBRx_4, respectively, as shown in the first table 602. Once the CC-Rx combinations 606 have been scheduled for tracking loops for SSB5, the UE further sets the binary variable corresponding to each of the scheduled CC-Rx combinations 606 to one, as shown in the second table 604.

At the next SSB (e.g., SSB6), the UE may again schedule measurements and tracking loops on one or CC-Rx combinations and then schedule the CC-Rx combinations 606 that have not yet been scheduled for tracking loops on any remaining available receivers 608 in order of component carrier. In the example shown in FIG. 6, the UE schedules an RLM measurement and a tracking loop procedure on PCC_rx0/1 and maps PCC_rx0/1 to NBRx_1. The UE may then schedule the non-scheduled CC-Rx combinations 606 for tracking loops on available receivers 608. Here, the non-scheduled CC-Rx combinations 606 include SCC2_rx0/1, SCC2_rx2/3, SCC3_rx0/1, and SCC3_rx2/3. For example, the UE may schedule SCC2_rx0/1, SCC2_rx2/3, and SCC3_rx0/1 on NBRx_2, NBRx_3 and NBRx_4, respectively, to perform respective tracking loop procedures, as shown in the first table 602. Once the CC-Rx combinations 606 have been scheduled for tracking loops for SSB6, the UE further sets the binary variable corresponding to each of the scheduled CC-Rx combinations 606 except SCC3_rx2/3 to one, as shown in the second table 604.

At the next SSB (e.g., SSB7), the UE may again schedule measurements and tracking loops on one or CC-Rx combinations and then schedule the CC-Rx combinations 606 that have not yet been scheduled for tracking loops on any remaining available receivers 608 in order of component carrier. In the example shown in FIG. 6, the UE forgoes scheduling measurements on CC-Rx combinations 606 for SSB2 and instead schedules the non-scheduled CC-Rx combinations 606 for tracking loops on available receivers 608. Here, there is only one non-scheduled CC-Rx combinations 606 (e.g., SCC3_rx2/3). Therefore, the UE first scheduled SCC3_rx2/3 on NBRx_1 to perform a loop tracking procedure and updates the binary variable of SCC3_rx2/3 to one. Since the binary variable of each of the CC-Rx combinations 606 is equal to one, the UE further resets the binary variable of each of the CC-Rx combinations 606 to zero in the middle of SSB7 and schedules additional CC-Rx combinations 606 for measurements or tracking loops on available receivers 608 in order of component carrier. For example, the UE may schedule PCC_rx0/1, PCC_rx2/3, and SCC1_rx0/1 on NBRx_2, NBRx_3, and NBRx_4, respectively, to perform tracking loops and update the respective binary variables of PCC_rx0/1, PCC_rx2/3, and SCC1_rx0/1 to one.

Example Hardware Implementation

Figure 7:
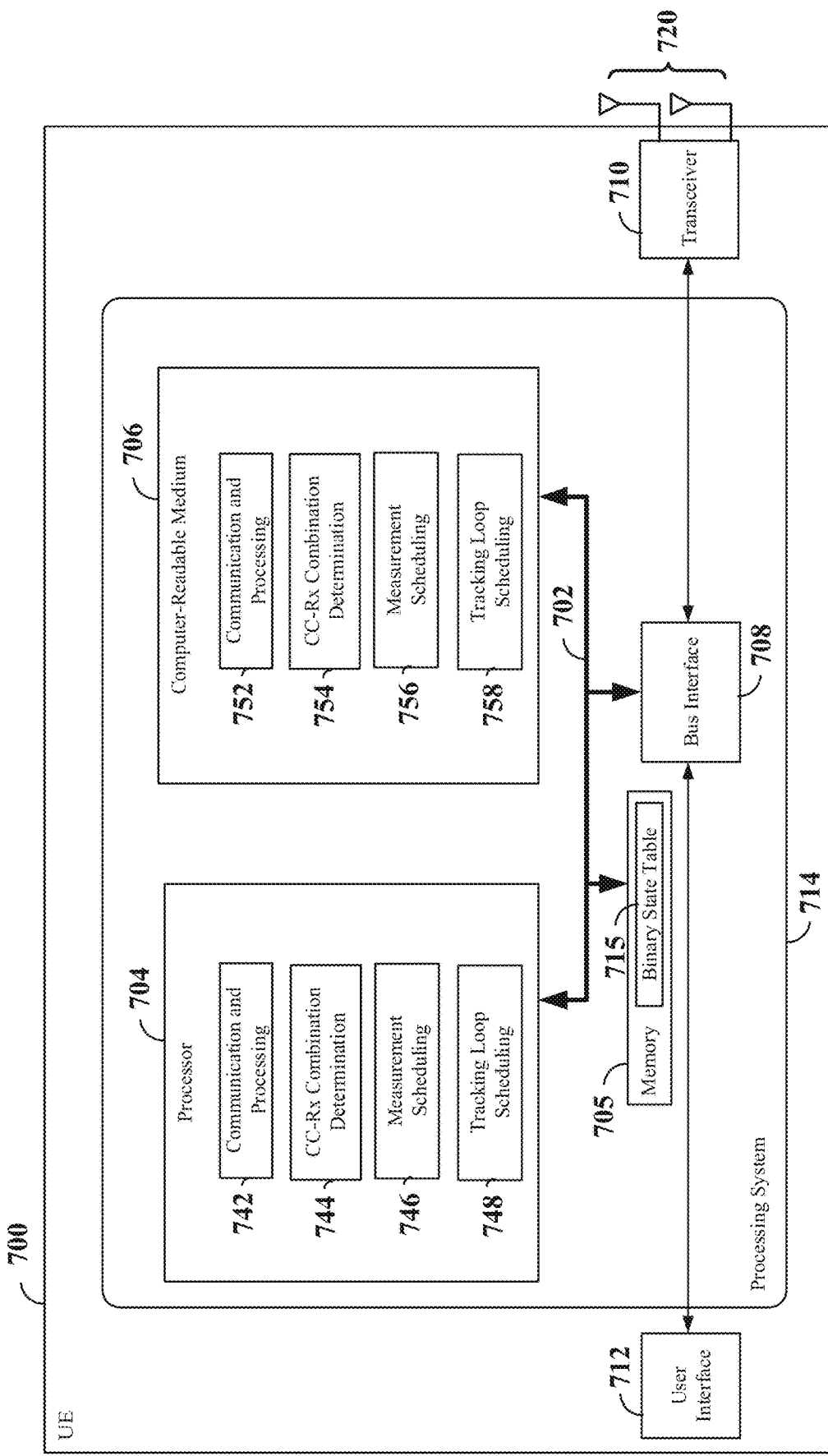
FIG. 7 is a block diagram illustrating an example of a hardware implementation for a UE employing a processing system according to some aspects.

FIG. 7 is a conceptual diagram illustrating an example of a hardware implementation for an exemplary UE employing a processing system 714. For example, the UE 700 may be any of the UEs illustrated in any one or more of FIG. 1 or 2.

The UE 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 700 may be configured to perform any one or more of the functions described herein. That is, the processor 704, as utilized in a UE 700, may be used to implement any one or more of the processes described below. The processor 704 may in some instances be implemented via a baseband or modem chip and in other implementations, the processor 704 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium (e.g., air interface). In some examples, the transceiver 710 includes the RF/ADC circuitry and DAC/RF circuitry illustrated in FIGS. 4 and 5. A user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. In some examples, the computer-readable medium 706 may be part of the memory 705. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include communication and processing circuitry 742, configured to communicate with a scheduling entity (e.g., a base station). In some examples, the communication and processing circuitry 742 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 742 may include two or more receivers, such as the receivers illustrated in FIGS. 4 and/or 5. In addition, the communication and processing circuitry 742 may further include the demultiplexer 508 shown in FIG. 5.

In some examples, the communication and processing circuitry 742 may be configured to receive a downlink RF signal from the scheduling entity via the transceiver 710 and at least one antenna pair 720 (only one of which is shown for convenience). In some examples, the downlink RF signal may include a set of two or more component carriers, each including a respective frequency. In some examples, each of the component carriers is an mmWave frequency or sub-6 GHz frequency. The component carriers may include, for example, a primary component carrier (PCC) and one or more activated secondary component carriers (SCCs). The communication and processing circuitry 742 may further be configured to execute communication and processing software 752 stored in the computer-readable medium 706 to implement one or more of the functions described herein.

The processor 704 may further include component carrier-antenna pair (CC-Rx) combination determination circuitry 744, configured to determine a plurality of combinations of a plurality of component carriers (e.g., component carriers) utilized by the base station for communication with the UE 700 and at least one antenna pair 720 within the UE 700. Each combination (e.g., CC-Rx combination) includes a respective antenna pair and a respective component carrier. In some examples, the CC-Rx combination determination circuitry 744 may populate a binary variable table 715 with each CC-Rx combination. The binary variable table 715 may be stored, for example, in memory 705 and may correspond to the second table 604 shown in FIG. 6. The CC-Rx combination determination circuitry 744 may further be configured to execute CC-Rx combination determination software 754 stored in the computer-readable medium 706 to implement one or more of the functions described herein.

The processor 704 may further include measurement scheduling circuitry 746, configured to schedule measurements of received SSBs on one or more combinations of component carriers and antenna pairs 720 (CC-Rx combinations) and to map the scheduled CC-Rx combinations to corresponding receivers within the communication and processing circuitry 742 to perform the measurements. Examples of measurements include, but are not limited to, RRM cell searches and measurements, RLM measurements, and/or on-demand measurements. The measurement scheduling circuitry 746 may further be configured to execute measurement scheduling software 756 stored in the computer-readable medium 706 to implement one or more of the functions described herein.

The processor 704 may further include tracking loop scheduling circuitry 748, configured to select CC-Rx combinations on which to perform tracking loop procedures and to map the selected CC-Rx combinations to receivers within the communication and processing circuitry 742 to perform the tracking loop procedures. In some examples, the tracking loop scheduling circuitry 748 may be configured to schedule tracking loops on each scheduled CC-Rx combination and corresponding receiver scheduled by the measurement scheduling circuitry 746 to enable simultaneous measurement and loop tracking on the scheduled CC-Rx combinations. The tracking loop scheduling circuitry 748 may further be configured to identify non-scheduled CC-Rx combinations, select CC-Rx combinations of the non-scheduled CC-Rx combinations based on the number of available receivers (e.g., excluding receivers on which a measurement is scheduled) and map the selected CC-Rx combinations to the available receivers to perform respective tracking loop procedures.

In some examples, the tracking loop scheduling circuitry 748 may be configured to maintain a respective binary variable corresponding to each of the CC-Rx combinations in the binary variable table 715 and to initialize the respective binary variable of each of the CC-Rx combinations in the binary variable table 715 to zero. The tracking loop scheduling circuitry 748 may further be configured to set the respective binary variable corresponding to each CC-Rx combination scheduled for performance of a measurement and a tracking loop procedure to one. The tracking loop scheduling circuitry 748 may then be configured to identify the non-scheduled CC-Rx combinations as those CC-Rx combinations having a binary variable of zero, and to select the selected CC-Rx combinations for performance of respective tracking loop procedures starting with the PCC followed by the SCCs in order of a respective component carrier identity associated with each of the SCCs. The tracking loop scheduling circuitry 748 may then be configured to set the respective binary variable corresponding to each of the selected CC-Rx combinations to one and reset the respective binary variable corresponding to each of the CC-Rx combinations to zero when the respective binary variable corresponding to each of the CC-Rx combinations is one. In some examples, the tracking loop scheduling circuitry 748 may further maintain the binary variable as one for each scheduled CC-Rx combination that is subsequently scheduled to perform an additional measurement and tracking loop procedure prior to resetting the binary variables corresponding to the CC-Rx combinations.

In some examples, the measurement scheduling circuitry 746 and tracking loop scheduling circuitry 748 may be included within the selection circuitry 510 shown in FIG. 5. The tracking loop scheduling circuitry 748 may further be configured to execute tracking loop scheduling software 758 stored in the computer-readable medium 706 to implement one or more of the functions described herein.

Figure 8:
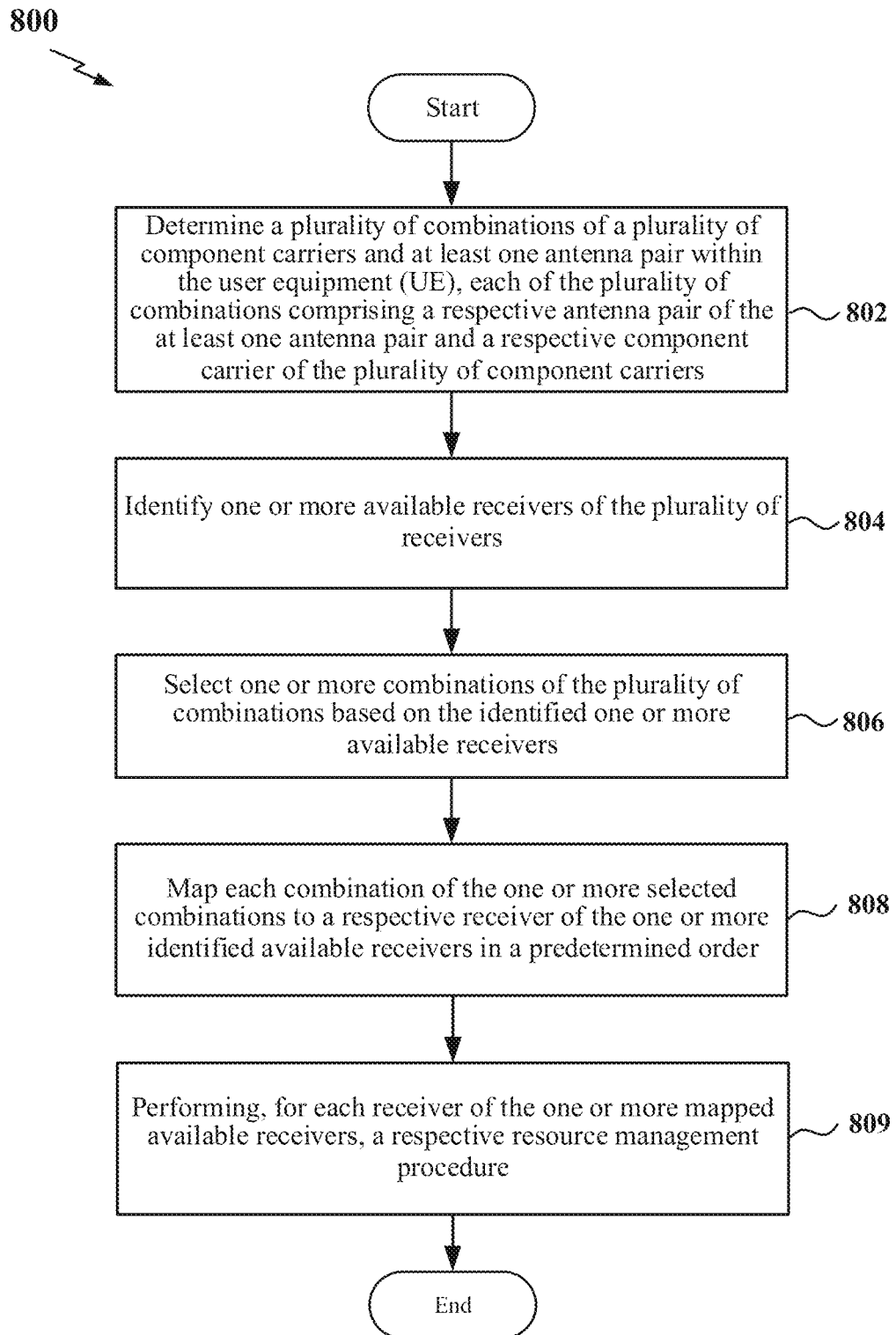
FIG. 8 is a flow chart of an exemplary method for a UE to schedule resource management procedures according to some aspects.

FIG. 8 is a flow chart 800 of a method for a UE to schedule resource management procedures according to some aspects. As described below, some or all illustrated features may be omitted in a particular implementation within the scope of the present disclosure, and some illustrated features may not be required for implementation of all embodiments. In some examples, the method may be performed by the UE 700, as described above and illustrated in FIG. 7, by a processor or processing system, or by any suitable means for carrying out the described functions.

At block 802, the UE may determine a plurality of combinations of a plurality of component carriers and at least one antenna pair within the UE. Each of the combinations (e.g., CC-Rx combinations) includes a respective antenna pair of the at least one antenna pair and a respective component carrier of the plurality of component carriers. Each of the component carriers is a component carrier including a respective frequency. For example, the CC-Rx combination determination circuitry 744, shown and described above in connection with FIG. 7, may determine the CC-Rx combinations.

At block 804, the UE may identify one or more available receivers of the plurality of receivers. In some examples, one or more available receivers may include a measuring subset of the one or more available receivers, selected based on a characteristic of the measurement. The measuring subset may be part of whole of the one or more available receivers. The measuring subset may be assigned for performing measurements concurrently with tracking loop procedures. In other example, the UE may schedule one or more CC-Rx combinations for performance of a tracking loop procedure. The UE may then identify at least one non-scheduled combination of the plurality of combinations. The one or more available receivers may include a tracking loop subset of the one or more available receivers that excludes the measuring subset of the one or more available receivers. The tracking loop subset may be part of whole of the one or more available receivers. The tracking loop subset may be assigned for performing tracking loop procedures. The UE may schedule one or more CC-Rx combinations for performance of both a measurement of a received reference signal (e.g., SSB) and a tracking loop procedure utilizing the SSB. The UE may then identify the non-scheduled CC-Rx combinations for the tracking loop procedure excluding the CC-Rx combinations mapped to and scheduled for measurements. In some examples, the UE may maintain a respective binary variable corresponding to each of the CC-Rx combinations and identify the non-scheduled combinations as the CC-Rx combinations having a binary variable of zero. For example, the tracking loop scheduling circuitry 748, shown and described above in connection with FIG. 7, may identify the non-scheduled combinations.

At block 806, the UE may select one or more combinations of the plurality of combinations based on the identified one or more available receivers. In some examples, the UE may select a subset of the one or more combinations based on the characteristic of the measurement. The characteristic of the measurement may be that the measurement is designated for at least one predetermined antenna pair of the plurality of antenna pairs. In other examples, the UE may select a subset of the one or more identified non-scheduled combinations based on the identified tracking loop subset of the one or more available receivers. In some examples, the available receivers exclude receivers already scheduled to perform a measurement with a tracking loop procedure on a CC-Rx combination for a current SSB. For example, the tracking loop scheduling circuitry 748, shown and described above in connection with FIG. 7, may select the selected combinations.

At block 808, the UE may map each combination of the one or more selected combinations to a respective receiver of the one or more identified available receivers in a predetermined order. In some examples, the resource management procedure may be a measurement which may include, e.g., at least one of a radio resource management measurement, a radio link failure measurement, and/or an on-demand measurement. In some examples, when a respective resource management procedure is a measurement, the UE may map each combination of the selected subset of the one or more combinations to a respective receiver of the measuring subset. In some examples, when a measurement is scheduled on a CC-Rx combination, a tracking loop procedure is also scheduled on the same CC-Rx combination. In some examples, the resource management procedure may be a tracking loop procedure including, but not limited to, a TTL, FTL, PDP estimation, or AGC procedure. In some examples, when a respective resource management procedure is a tracking loop procedure, the UE may map each combination of the selected subset of the one or more identified non-scheduled combinations to a respective receiver of the tracking loop subset. In some examples, the available receivers may exclude receivers already scheduled to perform a measurement with a tracking loop procedure on a CC-Rx combination for a current SSB. For example, the tracking loop scheduling circuitry 748, shown and described above in connection with FIG. 7, may map the selected combinations to available receivers.

At block 809, the UE may perform for each receiver of the one or more mapped available receivers, a respective resource management procedure.

Figure 9:
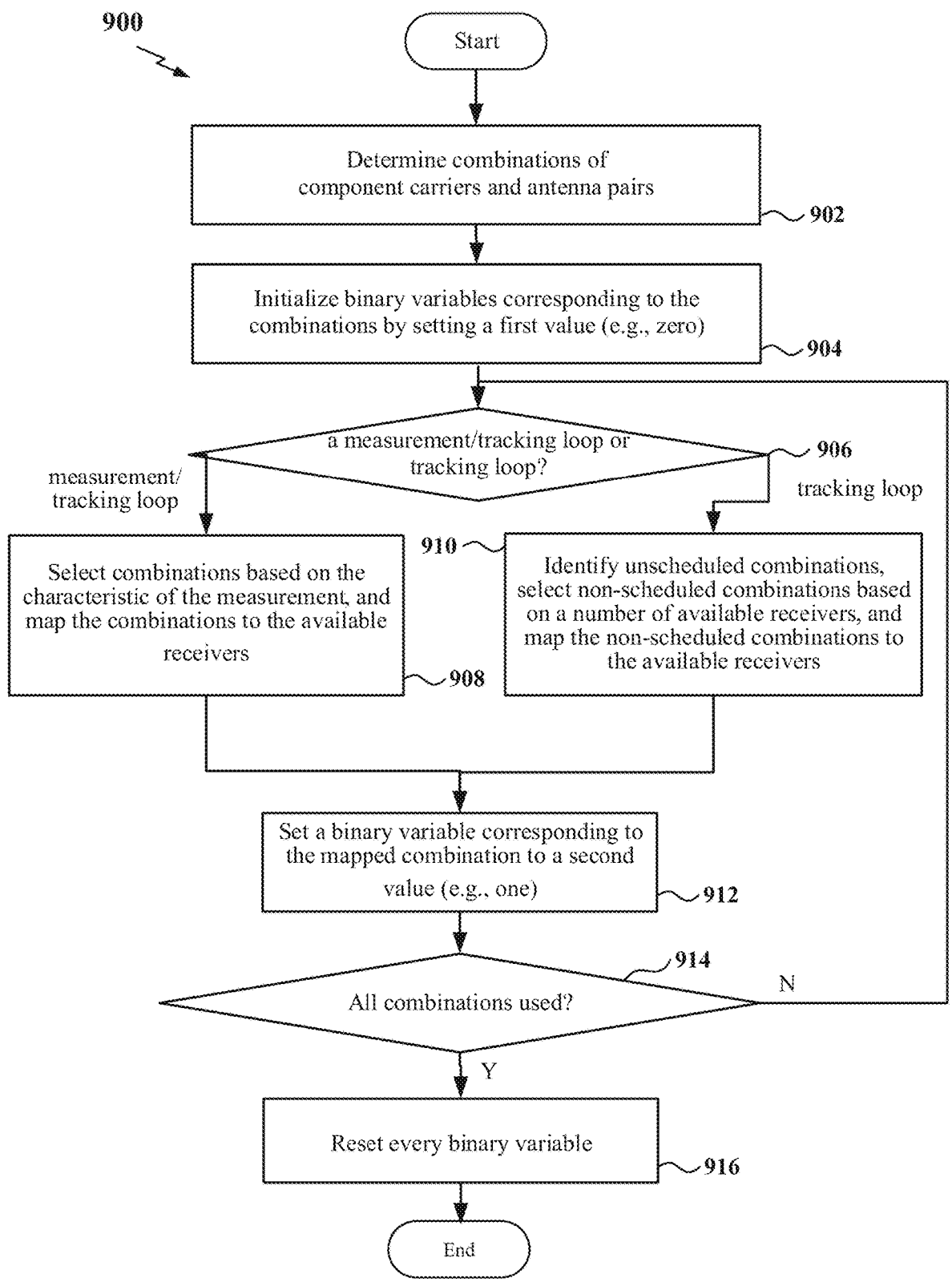
FIG. 9 is a flow chart of another exemplary method for a UE to schedule tracking loops according to some aspects.

FIG. 9 is a flow chart 900 of a method for a UE to schedule tracking loops according to some aspects. As described below, some or all illustrated features may be omitted in a particular implementation within the scope of the present disclosure, and some illustrated features may not be required for implementation of all embodiments. In some examples, the method may be performed by the UE 700, as described above and illustrated in FIG. 7, by a processor or processing system, or by any suitable means for carrying out the described functions.

At block 902, the UE may determine a plurality of combinations of a plurality of component carriers and at least one antenna pair within the UE. Each of the combinations (e.g., CC-Rx combinations) includes a respective antenna pair of the at least one antenna pair and a respective component carrier of the plurality of component carriers. Each of the component carriers is a component carrier including a respective frequency. For example, the CC-Rx combination determination circuitry 744, shown and described above in connection with FIG. 7, may determine the CC-Rx combinations.

At block 904, the UE may provide a binary variable table of binary variables in a non-transitory computer readable medium. In the table, a binary variable having a first value indicates a corresponding combination of the plurality of combinations is available to perform a corresponding resource management procedure. In the binary variable table, a binary variable having a second value indicates the corresponding combination of the plurality of combinations is unavailable to perform a corresponding tracking loop procedure. The UE may initialize each binary variable of the binary variable table to the first value. In some examples, the UE may maintain a binary variable table including the respective binary variable of each of the CC-Rx combinations and initialize the binary variable of each CC-Rx combination to the first value (e.g., zero) when the binary variable of each CC-Rx combination has the second value (e.g., one). For example, the tracking loop scheduling circuitry 748, shown and described above in connection with FIG. 7, may initialize the binary variable of each CC-Rx combination to zero.

At block 906, the UE may determine whether a resource management procedure to be performed is a measurement/tracking loop procedure or a tracking loop procedure.

If the resource management procedure is a measurement/tracking loop procedure (measurement/tracking loop branch of block 906), at block 908, the UE may select a subset of one or more combinations based on the characteristic of the measurement, and map each combination of the selected set of one or more combinations to a respective receiver of the measuring subset of the one or more available receivers for performing the measurement with the tracking loop procedure. The measuring subset may be a part or whole of the one or more available receivers. For example, the measurement scheduling circuitry 746, shown and described above in connection with FIG. 7, may handle the process of block 908.

At block 912, the UE may set a binary variable of the respective mapped CC_Rx combination as a second value (e.g., one). In addition, the UE may perform the resource management procedure, e.g., the measurement/tracking loop procedure with the mapped CC_Rx combination.

If the resource management procedure is a tracking loop procedure (tracking loop procedure branch of block 906), at block 910, the UE may identify one or more non-scheduled combinations of the one or more selected combinations, select a subset of the one or more identified non-scheduled combinations based on the tracking loop subset of the one or more available receivers, and map each of the selected set of the one or more identified non-scheduled combinations to a respective receiver of the tracking loop subset. The tracking loop subset may be a part of or whole of the one or more available receivers. The tracking loop procedure may be, but not limited to, a TTL, FTL, PDP estimation, or AGC procedure. For example, the tracking loop scheduling circuitry 748, shown and described above in connection with FIG. 7, may handle the process of block 910.

Then, at block 912, the UE may set a binary variable of the respective mapped CC_Rx combination as a second value (e.g., one). The UE may set the binary variable of each scheduled combination to one. In some examples, the UE may schedule one or more CC-Rx combinations for performance of both a measurement of a received reference signal (e.g., SSB) and a tracking loop procedure utilizing the SSB and then set the binary variable of each such scheduled CC-Rx combination to the second value (e.g., one). In some examples, the UE may further select one or more CC-Rx combinations for scheduling of a tracking loop procedure and may then set the binary variable of each such scheduled CC-Rx combination to the second value (e.g., one). For example, the tracking loop scheduling circuitry 748, shown and described above in connection with FIG. 7, may set the binary variable of each scheduled combination to one. In addition, the UE may perform the resource management procedure, e.g., the tracking loop procedure with the mapped CC_Rx combination.

At block 914, the UE may determine whether every binary variable corresponding to the plurality of combinations reaches the second value (e.g., one).

If every binary variable is the second value (e.g., one) (Yes branch of block 914), the UE may reset each binary variable of the binary variable table to the first value in block 916. If the UE receives another reference signal (e.g., SSB), the UE may skip the processes of blocks 902 and 904 and perform processes from block 906.

Figure 10:
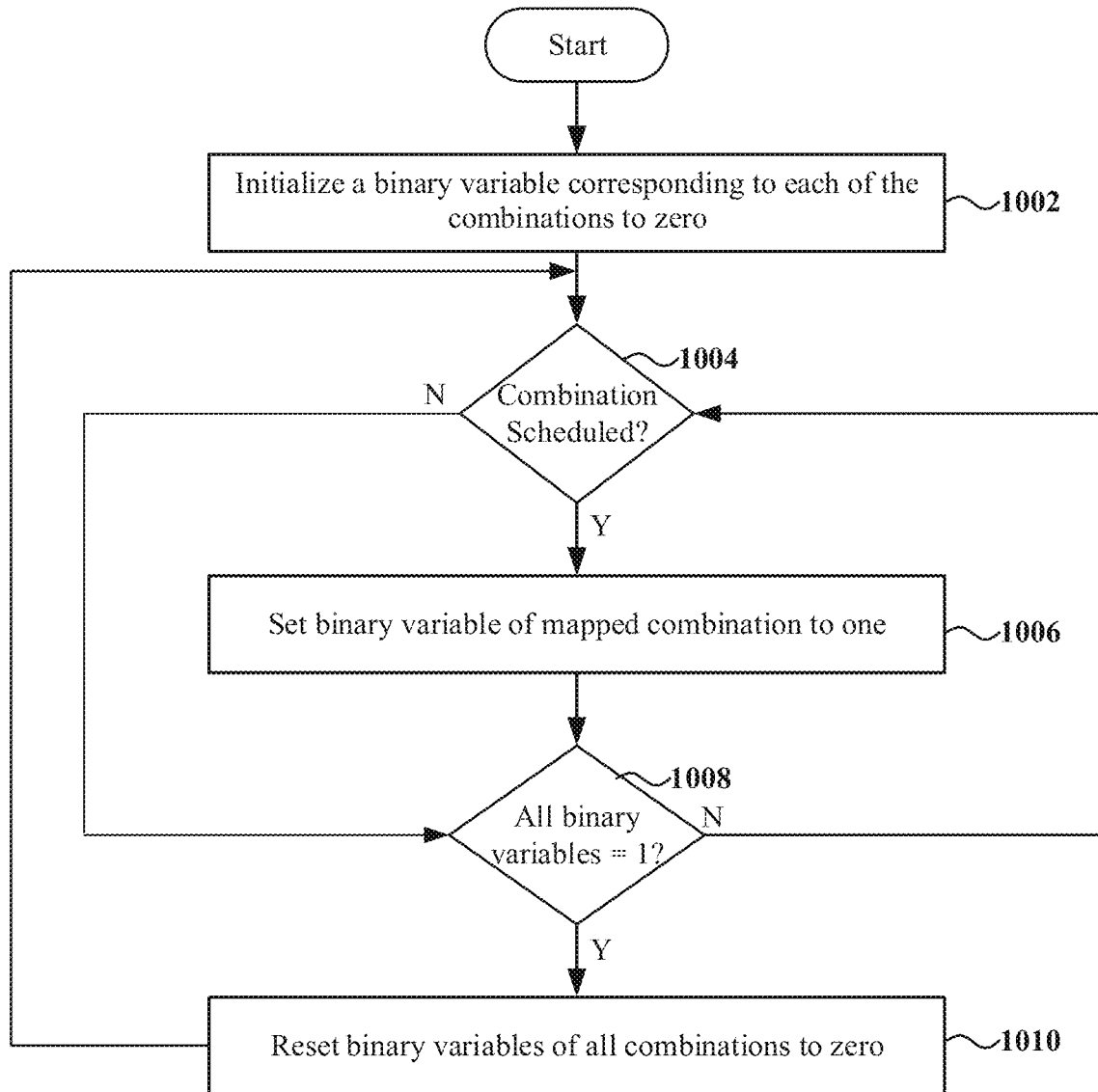
FIG. 10 is a flow chart of a method for a UE to maintain a binary variable for each of a plurality of combinations of component carriers and antenna pairs according to some aspects.

FIG. 10 is a flow chart 1000 of a method for a UE to maintain a binary variable for each of a plurality of combinations of component carriers and antenna pairs according to some aspects. As described below, some or all illustrated features may be omitted in a particular implementation within the scope of the present disclosure, and some illustrated features may not be required for implementation of all embodiments. In some examples, the method may be performed by the UE 700, as described above and illustrated in FIG. 7, by a processor or processing system, or by any suitable means for carrying out the described functions.

At block 1002, the UE may initialize or set a respective binary variable of each of the combinations (e.g., CC-Rx combinations) to a first value (e.g., zero) before firstly identifying the available receivers. In some examples, the UE may maintain a binary variable table populated with each of the CC-Rx combinations and initialize or set the binary variable of each CC-Rx combination in the binary variable table to the first value (e.g., zero). For example, the tracking loop scheduling circuitry 748, shown and described above in connection with FIG. 7, may initialize or set the binary variable of each CC-Rx combination to the first value (e.g., zero).

At block 1004, the UE may determine whether a CC-Rx combination has been scheduled. In some examples, the UE may schedule one or more CC-Rx combinations for performance of both a measurement of a received reference signal (e.g., SSB) and a tracking loop procedure utilizing the SSB. In some examples, the UE may select one or more CC-Rx combinations for scheduling of a tracking loop procedure. For example, the tracking loop scheduling circuitry 748, shown and described above in connection with FIG. 7, may determine whether a CC-Rx combination has been scheduled.

If a CC-Rx combination has been scheduled (Y branch of block 1004), at block 1006, the UE may set the binary variable of the scheduled CC-Rx combination to one. In some examples, the UE may set the binary variable of the scheduled CC-Rx combination in the binary variable table to one. For example, the tracking loop scheduling circuitry 748, shown and described above in connection with FIG. 7 may set the binary variable of the scheduled combination to one.

At block 1008, the UE may determine whether the binary variables of all CC-Rx combinations are set to one. In some examples, the UE may determine whether the binary variable table includes a binary variable of one for each CC-Rx combination. For example, the tracking loop scheduling circuitry 748, shown and described above in connection with FIG. 7, may determine whether all binary variables are set to one.

If all binary variables are set to one (Y branch of block 1008), at block 1010, the UE may reset the binary variables of all of the CC-Rx combinations to zero. In some examples, the UE may reset the respective binary variable of each CC-Rx combination in the binary variable table to zero. For example, the tracking loop scheduling circuitry 748, shown and described above in connection with FIG. 7, may reset the binary variables of the CC-Rx combinations to zero. The method then proceeds back to block 1004, where the UE may determine whether a CC-Rx combination has been scheduled.

In one configuration, a user equipment (UE) includes means for determining a plurality of combinations of a plurality of component carriers and at least one antenna pair within the UE, in which each of the plurality of combinations includes a respective antenna pair of the at least one antenna pair and a respective component carrier of the plurality of component carriers and each of the plurality of component carriers includes a respective frequency. The UE further includes means for identifying non-scheduled combinations of the plurality of combinations, means for selecting selected combinations of the non-scheduled combinations based on a number of available receivers of two or more receivers within the UE, and means for mapping each of the selected combinations to one of the available receivers to perform a respective tracking loop procedure.

In one aspect, the aforementioned means for determining the plurality of combinations, means for identifying non-scheduled combinations, means for selecting selected combinations, and means for mapping each of the selected combinations to one of the available receivers may be the processor(s) 704 shown in FIG. 7 configured to perform the functions recited by the aforementioned means. For example, the means for determining the plurality of combinations may include the CC-Rx combination determination circuitry 744 shown in FIG. 7. As another example, the means for identifying non-scheduled combinations, means for selecting selected combinations, and means for mapping each of the selected combinations to one of the available receivers may include the tracking loop scheduling circuitry 748 shown in FIG. 7. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

Example 1

A UE, a method for wireless communication at a UE, and a non-transitory computer readable medium storing computer executable code are disclosed. In these examples, a UE includes a plurality of receivers and a plurality of antenna pairs. The UE determines a plurality of combinations of a plurality of component carriers and the plurality of antenna pairs. Here, each of the plurality of combinations includes a respective antenna pair of the plurality of antenna pairs and a respective component carrier of the plurality of component carriers. The UE further identifies one or more available receivers of the plurality of receivers, and selects one or more combinations of the plurality of combinations based on the identified one or more available receivers. The UE maps each combination of the one or more selected combinations to a respective receiver of the one or more identified available receivers in a predetermined order. The UE accordingly performs a respective resource management procedure for each receiver of the one or more mapped available receivers.

Example 2

A UE, a method for wireless communication at a UE, and a non-transitory computer readable medium storing computer executable code according to Example 1, where the resource management procedure for a first receiver of the one or more mapped available receivers includes a measurement and a first tracking loop procedure. The one or more available receivers includes a measuring subset of the one or more available receivers, selected based on a characteristic of the measurement. Further, the selecting one or more combinations includes selecting a subset of the one or more combinations based on the characteristic of the measurement. And the mapping includes mapping each combination of the selected subset of the one or more combinations to a respective receiver of the measuring subset.

Example 3

A UE, a method for wireless communication at a UE, and a non-transitory computer readable medium storing computer executable code according to any of Examples 1 to 2, where the UE further identifies one or more non-scheduled combinations of the one or more selected combinations. In this example, the resource management procedure for a second receiver of the one or more mapped available receivers includes a second tracking loop procedure. The one or more available receivers further includes a tracking loop subset of the one or more available receivers that excludes the measuring subset of the one or more available receivers. And further, the selecting one or more combinations further includes selecting a subset of the one or more identified non-scheduled combinations based on the identified tracking loop subset of the one or more available receivers. The mapping further includes mapping each combination of the selected subset of the one or more identified non-scheduled combinations to a respective receiver of the tracking loop subset.

Example 4

A UE, a method for wireless communication at a UE, and a non-transitory computer readable medium storing computer executable code according to any of Examples 1 to 3, where the UE further provides a table of binary variables in a non-transitory computer readable medium. Accordingly, a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure. When a first combination of the plurality of combinations is mapped to a first receiver of the one or more identified available receivers, the UE sets, in the table, a first binary variable corresponding to the first combination to the second value. When a respective binary variable corresponding to each combination of the plurality of combinations has the second value, the UE resets each binary variable of the table to the first value.

Example 5

A UE, a method for wireless communication at a UE, and a non-transitory computer readable medium storing computer executable code according to any of Examples 1 to 4, where the measurement includes at least one of a radio resource management measurement, a radio link failure measurement, or an on-demand measurement.

Example 6

A UE, a method for wireless communication at a UE, and a non-transitory computer readable medium storing computer executable code according to any of Examples 1 to 5, where the characteristic of the measurement is that the measurement is designated for at least one predetermined antenna pair of the plurality of antenna pairs.

Example 7

A UE, a method for wireless communication at a UE, and a non-transitory computer readable medium storing computer executable code according to any of Examples 1 to 6, where the UE further identifies one or more non-scheduled combinations of the one or more selected combinations. The resource management procedure further includes a tracking loop procedure, and the one or more available receivers include a tracking loop subset of the one or more available receivers. Further, the selecting one or more combinations includes selecting a subset of the one or more identified non-scheduled combinations based on the identified tracking loop subset of the one or more available receivers. And the mapping incudes mapping each combination of the selected subset of the one or more identified non-scheduled combinations to a respective receiver of the identified tracking loop subset.

Example 8

A UE, a method for wireless communication at a UE, and a non-transitory computer readable medium storing computer executable code according to any of Examples 1 to 7, where the tracking loop procedure includes at least one of a time tracking loop procedure, a frequency tracking loop procedure, a power delay profile estimation procedure, or an automatic gain control procedure.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional stages, components, steps, and/or functions may also be added without departing from novel features disclosed herein. The apparatus, devices, and/or components illustrated in FIGS. 1, 2, 4, 5, and 7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication at a user equipment (UE) comprising a plurality of receivers and a plurality of antenna pairs, the method comprising:
   determining a plurality of combinations of a plurality of component carriers and the plurality of antenna pairs, each of the plurality of combinations comprising a respective antenna pair of the plurality of antenna pairs and a respective component carrier of the plurality of component carriers;
   identifying one or more available receivers of the plurality of receivers;
   selecting one or more combinations of the plurality of combinations based on the identified one or more available receivers;
   mapping each combination of the one or more selected combinations to a respective receiver of the one or more identified available receivers; and
   performing, for each receiver of the one or more mapped available receivers, a respective resource management procedure.

2. The method of claim 1, wherein the resource management procedure for a first receiver of the one or more mapped available receivers comprises at least one of a measurement or a first tracking loop procedure,
   wherein the one or more available receivers comprises a measuring subset of the one or more available receivers, selected based on a characteristic of the measurement,
   wherein the selecting one or more combinations comprises selecting a subset of the one or more combinations based on the characteristic of the measurement, and
   wherein the mapping comprises mapping each combination of the selected subset of the one or more combinations to a respective receiver of the measuring subset.

3. The method of claim 2, the method further comprising:
   identifying one or more non-scheduled combinations of the one or more selected combinations,
   wherein the resource management procedure for a second receiver of the one or more mapped available receivers comprises a second tracking loop procedure,
   wherein the one or more available receivers further comprises a tracking loop subset of the one or more available receivers that excludes the measuring subset of the one or more available receivers,
   wherein the selecting one or more combinations further comprises selecting a subset of the one or more identified non-scheduled combinations based on the identified tracking loop subset of the one or more available receivers, and
   wherein the mapping further comprises mapping each combination of the selected subset of the one or more identified non-scheduled combinations to a respective receiver of the tracking loop subset.

4. The method of claim 3, further comprising:
   providing a table of binary variables in a non-transitory computer readable medium, such that a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure;
   when a first combination of the plurality of combinations is mapped to a first receiver of the one or more identified available receivers, setting, in the table, a first binary variable corresponding to the first combination to the second value; and
   when a respective binary variable corresponding to each combination of the plurality of combinations has the second value, resetting each binary variable of the table to the first value.

5. The method of claim 2, wherein the measurement comprises at least one of a radio resource management measurement, a radio link failure measurement, or an on-demand measurement.

6. The method of claim 2, wherein the characteristic of the measurement is that the measurement is designated for at least one predetermined antenna pair of the plurality of antenna pairs.

7. The method of claim 1, the method further comprising:
   identifying one or more non-scheduled combinations of the one or more selected combinations,
   wherein the resource management procedure comprises a tracking loop procedure,
   wherein the one or more available receivers comprises a tracking loop subset of the one or more available receivers,
   wherein the selecting one or more combinations comprises selecting a subset of the one or more identified non-scheduled combinations based on the identified tracking loop subset of the one or more available receivers, and
   wherein the mapping comprises mapping each combination of the selected subset of the one or more identified non-scheduled combinations to a respective receiver of the identified tracking loop subset.

8. The method of claim 7, wherein the tracking loop procedure comprises at least one of a time tracking loop procedure, a frequency tracking loop procedure, a power delay profile estimation procedure, or an automatic gain control procedure.

9. The method of claim 7, further comprising:
providing a table of binary variables in a non-transitory computer readable medium, such that a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure; and
initializing each binary variable of the table to the first value.

10. The method of claim 7, further comprising:
providing a table of binary variables in a non-transitory computer readable medium, such that a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure; and
when a first combination of the plurality of combinations is mapped to a first receiver of the one or more identified available receivers, setting, in the table, a first binary variable corresponding to the first combination to the second value.

11. The method of claim 10, wherein the identifying one or more non-scheduled combinations further comprises identifying a respective binary variable corresponding to each of the one or more non-scheduled combinations, the respective binary variable having the first value.

12. The method of claim 11, further comprising:
when a first respective binary variable corresponding to each combination of the plurality of combinations has the second value, resetting each binary variable of the table to the first value.

13. A user equipment (UE) in a wireless communication network, comprising:
a plurality of antenna pairs;
two or more receivers coupled to the plurality of antenna pairs;
a memory; and
a processor communicatively coupled to the two or more receivers and the memory, wherein the processor is configured to:
determine a plurality of combinations of a plurality of component carriers and the plurality of antenna pairs, each of the plurality of combinations comprising a respective antenna pair of the plurality of antenna pairs and a respective component carrier of the plurality of component carriers;
identify one or more available receivers of the plurality of receivers;
select one or more combinations of the plurality of combinations based on the identified one or more available receivers;
map each combination of the one or more selected combinations to a respective receiver of the one or more identified available receivers; and
perform, for each receiver of the one or more mapped available receivers, a respective resource management procedure.

14. The UE of claim 13, wherein the resource management procedure comprises a measurement,
wherein the one or more available receivers comprises a measuring subset of the one or more available receivers, selected based on a characteristic of the measurement,
wherein the selecting one or more combinations comprises selecting a subset of the one or more combinations based on the characteristic of the measurement, and
wherein the mapping comprises mapping each combination of the selected subset of the one or more combinations to a respective receiver of the measuring subset.

15. The UE of claim 13, wherein the processor is further configured to identify one or more non-scheduled combinations of the one or more selected combinations,
wherein the resource management procedure comprises a tracking loop procedure,
wherein the one or more available receivers comprises a tracking loop subset of the one or more available receivers,
wherein the selecting one or more combinations comprises select a subset of the one or more identified non-scheduled combinations based on the identified tracking loop subset of the one or more available receivers, and
wherein the mapping comprises map each combination of the selected subset of the one or more identified non-scheduled combinations to a respective receiver of the identified tracking loop subset.

16. The UE of claim 15, wherein the processor is further configured to:
provide a table of binary variables in a non-transitory computer readable medium, such that a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure; and
when a first combination of the plurality of combinations is mapped to a first receiver of the one or more identified available receivers, set, in the table, a first binary variable corresponding to the first combination to the second value.

17. The UE of claim 16, wherein the identifying one or more non-scheduled combinations further comprises identify a respective binary variable corresponding to each of the one or more non-scheduled combinations, the respective binary variable having the first value.

18. The UE of claim 17, wherein the processor is further configured to:
when a first respective binary variable corresponding to each combination of the plurality of combinations has the second value, reset each binary variable of the table to the first value.

19. A user equipment (UE) in a wireless communication network, comprising:
means for determining a plurality of combinations of a plurality of component carriers and a plurality of antenna pairs, each of the plurality of combinations comprising a respective antenna pair of the plurality of antenna pairs and a respective component carrier of the plurality of component carriers;
means for identifying one or more available receivers of a plurality of receivers;

means for selecting one or more combinations of the plurality of combinations based on the identified one or more available receivers;

means for mapping each combination of the one or more selected combinations to a respective receiver of the one or more identified available receivers; and means for performing, for each receiver of the one or more mapped available receivers, a respective resource management procedure.

20. The UE of claim 19, wherein the resource management procedure comprises a measurement,
wherein the one or more available receivers comprises a measuring subset of the one or more available receivers, selected based on a characteristic of the measurement,
wherein the means for selecting one or more combinations comprises means for selecting a subset of the one or more combinations based on the characteristic of the measurement, and
wherein the means for mapping comprises means for mapping each combination of the selected subset of the one or more combinations to a respective receiver of the measuring subset.

21. The UE of claim 19, further comprising:
means for identifying one or more non-scheduled combinations of the one or more selected combinations,
wherein a respective resource management procedure comprises a tracking loop procedure,
wherein the one or more available receivers comprises a tracking loop subset of the one or more available receivers,
wherein the means for selecting one or more combinations comprises means for selecting a subset of the one or more identified non-scheduled combinations based on the identified tracking loop subset of the one or more available receivers, and
wherein the means for mapping comprises means for mapping each combination of the selected subset of the one or more identified non-scheduled combinations to a respective receiver of the identified tracking loop subset.

22. The UE of claim 21, further comprising:
means for providing a table of binary variables in a non-transitory computer readable medium, such that a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure; and
when a first combination of the plurality of combinations is mapped to a first receiver of the one or more identified available receivers, means for setting, in the table, a first binary variable corresponding to the first combination to the second value.

23. The UE of claim 22, wherein the means for identifying one or more non-scheduled combinations further comprises means for identifying a respective binary variable corresponding to each of the one or more non-scheduled combinations, the respective binary variable having the first value.

24. The UE of claim 23, further comprising:
when a first respective binary variable corresponding to each combination of the plurality of combinations has the second value, means for resetting each binary variable of the table to the first value.

25. A non-transitory computer-readable medium storing computer-executable code, comprising code for causing a user equipment (UE) to:
determine a plurality of combinations of a plurality of component carriers and a plurality of antenna pairs, each of the plurality of combinations comprising a respective antenna pair of the plurality of antenna pairs and a respective component carrier of the plurality of component carriers;
identify one or more available receivers of a plurality of receivers;
select one or more combinations of the plurality of combinations based on the identified one or more available receivers;
map each combination of the one or more selected combinations to a respective receiver of the one or more identified available receivers; and
perform, for each receiver of the one or more mapped available receivers, a respective resource management procedure.

26. The non-transitory computer-readable medium of claim 25, wherein the resource management procedure comprises a measurement,
wherein the one or more available receivers comprises a measuring subset of the one or more available receivers, selected based on a characteristic of the measurement,
wherein the selecting one or more combinations comprises selecting a subset of the one or more combinations based on the characteristic of the measurement, and
wherein the mapping comprises mapping each combination of the selected subset of the one or more combinations to a respective receiver of the measuring subset.

27. The non-transitory computer-readable medium of claim 25, wherein the non-transitory computer-readable medium further comprises code for causing the UE to identify one or more non-scheduled combinations of the one or more selected combinations,
wherein the resource management procedure comprises a tracking loop procedure,
wherein the one or more available receivers comprises a tracking loop subset of the one or more available receivers,
wherein the selecting one or more combinations comprises select a subset of the one or more identified non-scheduled combinations based on the identified tracking loop subset of the one or more available receivers, and
wherein the mapping comprises map each combination of the selected subset of the one or more identified non-scheduled combinations to a respective receiver of the identified tracking loop subset.

28. The non-transitory computer-readable medium of claim 27, further comprising code for causing the UE to:
provide a table of binary variables in a non-transitory computer readable medium, such that a binary variable indicating a first value indicates a corresponding combination of the plurality of combinations is available to perform a corresponding resource management procedure, and indicating a second value indicates the corresponding combination of the plurality of combinations is unavailable to perform a corresponding tracking loop procedure; and
when a first combination of the plurality of combinations is mapped to a first receiver of the one or more identified available receivers, set, in the table, a first binary variable corresponding to the first combination to the second value.

29. The non-transitory computer-readable medium of claim 28, wherein the identifying one or more non-scheduled combinations further comprises identify a respective binary variable corresponding to each of the one or more non-scheduled combinations, the respective binary variable having the first value.

30. The non-transitory computer-readable medium of claim 29, further comprising code for causing the UE to:
when a first respective binary variable corresponding to each combination of the plurality of combinations has the second value, reset each binary variable of the table to the first value.

* * * * *